US010618051B2

(12) United States Patent
Baaske et al.

(10) Patent No.: US 10,618,051 B2
(45) Date of Patent: Apr. 14, 2020

(54) METHOD AND SYSTEM FOR TEMPERING CAPILLARIES WITHOUT SEALING THEM

(71) Applicant: Nanotemper Technologies GmbH, München (DE)

(72) Inventors: Philipp Baaske, München (DE); Stefan Duhr, München (DE)

(73) Assignee: NANOTEMPER TECHNOLOGIES GMBH, München (DE)

( * ) Notice: Subject to any disclaimer, the term of this patent is extended or adjusted under 35 U.S.C. 154(b) by 257 days.

(21) Appl. No.: 15/535,163

(22) PCT Filed: Dec. 11, 2015

(86) PCT No.: PCT/EP2015/079459
§ 371 (c)(1),
(2) Date: Jun. 12, 2017

(87) PCT Pub. No.: WO2016/092086
PCT Pub. Date: Jun. 16, 2016

(65) Prior Publication Data

US 2017/0361326 A1 Dec. 21, 2017

(30) Foreign Application Priority Data

Dec. 12, 2014 (DE) ........................ 10 2014 018 535

(51) Int. Cl.
*G01N 21/03* (2006.01)
*B01L 9/06* (2006.01)
(Continued)

(52) U.S. Cl.
CPC ................. *B01L 9/065* (2013.01); *B01L 7/00* (2013.01); *B01L 2200/027* (2013.01);
(Continued)

(58) Field of Classification Search
CPC .... B01L 9/065; B01L 9/06; B01L 9/00; B01L 7/00; G01N 21/03; G01N 21/00
(Continued)

(56) References Cited

U.S. PATENT DOCUMENTS 5,720,923 A 2/1998 Haff et al.
9,372,133 B2 6/2016 Sekizawa et al.
(Continued)

FOREIGN PATENT DOCUMENTS

DE 10 2004 022 236 A1 12/2005
DE 10 2004 022 263 A1 12/2005
(Continued)

OTHER PUBLICATIONS

International Search Report and Written Opinion for International Application No. PCT/EP2015/079459, dated Mar. 9, 2016, 7 pages.
(Continued)

*Primary Examiner* — Christine T Mui
(74) *Attorney, Agent, or Firm* — Westman, Champlin & Koehler, P.A.

(57) ABSTRACT

The invention relates to a method for tempering a plurality of capillaries, which are arranged on a carrier, wherein the carrier having a length, width and height receives the capillaries along the width of the carrier. The carrier has a recess in order to receive a tempering element so that the capillaries may be tempered in their central region by means of contact with the tempering element. According to the invention, the ends of the capillaries filled with samples are unsealed during tempering.

23 Claims, 12 Drawing Sheets

(51) Int. Cl.
*B01L 7/00* (2006.01)
*B01L 9/00* (2006.01)

(52) U.S. Cl.
CPC ..... *B01L 2200/142* (2013.01); *B01L 2200/18* (2013.01); *B01L 2300/0825* (2013.01); *B01L 2300/1805* (2013.01); *B01L 2400/0406* (2013.01)

(58) Field of Classification Search
USPC .......................................................... 436/164
See application file for complete search history.

(56) References Cited

U.S. PATENT DOCUMENTS

| | | | | |
|---|---|---|---|---|
| 2005/0247701 | A1 | 11/2005 | Deka et al. | |
| 2006/0131196 | A1* | 6/2006 | Fuhr | A01N 1/02 206/438 |
| 2008/0292504 | A1 | 11/2008 | Goodsaid et al. | |
| 2010/0136632 | A1 | 6/2010 | Lipscomb et al. | |
| 2011/0039305 | A1 | 2/2011 | Termaat et al. | |
| 2013/0101993 | A1 | 4/2013 | Sekizawa et al. | |
| 2015/0137005 | A1* | 5/2015 | Baaske | B01L 9/065 250/453.11 |

FOREIGN PATENT DOCUMENTS

| | | | | |
|---|---|---|---|---|
| EP | 2 572 787 | A1 * | 3/2013 | B01L 3/14 |
| EP | 2 848 309 | A1 * | 3/2015 | B01L 9/06 |
| JP | 2004-187678 | A | 7/2004 | |
| WO | 97/48818 | A1 | 2/1997 | |
| WO | 2007/082466 | A1 | 7/2007 | |
| WO | 2012/001972 | A1 | 1/2012 | |

OTHER PUBLICATIONS

Kuriki, Takashi et al., Review, “The Concept of the α-Amylase Family: Structural Similarity and Common Catalytic Mechanism”, Journal of Bioscience and Bioengineering, vol. 87, No. 5, 557-565, 1999, 9 pages.

Hartl, F. Ulrich, Review, “Molecular chaperones in protein folding and proteostasis”, doi:10.1038/nature10317, Department of Cellular Biology, Max Planck Institute of Biochemistry, Am Slopferspitz 18, 82152, Martinsried, Germany, Nature, vol. 475, Jul. 21, 2011, © 2011 Macmillan Publishers Limited, 9 pages.

Fukada, Harumi et al., “Differential Scanning Calorimetric Study of the Thermal Unfolding of Taka-amylase A from Aspergillus oryzae†”, Biochemistry 1987, 26, 4063-4068, 0006-2960/87/0426-4063$01.50/0, ©1987 American Chemical Society, 6 pages.

Fitter, J., Review, “Structural and dynamical features contributing to thermostability in α-amylases”, CMLS Cellular and Molecular Life Sciences, CMLS, Cell. Mol. Life Sci. 62 (2005) 1925-1937, 1420-682X/05/171925-13, DOI 10.1007/s0018-005-5079-2, © Birkhäuser Verlag, Basel, 2005, 13 pages.

Feller, George et al., “Thermodynamic Stability of a Cold-Active R-Amylase from the Antarctic Bacterium *Alteromonas haloplanctis*†”, Biochemistry 1999, 38, 4613-4619, 10.1021/bi982650+ CCC: $18.00, © 1999 American Chemical Society, published on Web Mar. 13, 1999, 7 pages.

Ducancel, Frédéric et al., Review, “Molecular engineering of antibodies for therapeutic and diagnostic purposes”, mAbs 4:4, 445-457; Jul. /Aug. 2012; © 2012 Landes Bioscience, 13 pages.

Senisterra, Guillermo et al., Technology Review, “Thermal Denaturation Assays in Chemical Biology”, Assay and Drug Development Technologies, Apr. 2012, DOI: 10.1089/adt.2011.0390, 9 pages.

Silvestre, Hernani Leonardo et al., “Integrated biophysical approach to fragment screening and validation for fragment-based lead discovery”, 12984-12989, PNAS, Aug. 6, 2013, vol. 110, No. 32, www.pnas.org/cg/doi/10.1073/pnas.1304045110, 6 pages.

Filpula, David, Review, “Antibody engineering and modification technologies”, ScienceDirect, Biomolecular Engineering 34 (2007) 201-215, Elsevier, 15 pages.

Yadav, Jay Kant et al., “Thermal stability of α-amylase in aqueous cosolvent systems”, http://www.ias.ac.in/jbiosci , J. Biosci. 34(3), Sep. 2009, 377-387, © Indian Academy of Sciences, 11 pages.

Lakowicz, Joseph R., “Principles of Fluorescence Spectroscopy, Third Edition”, Springer, Library of Congress Control No. 2006920796, ISBN-10: 0-387-31278-1, ISBN-13: 978-0387-31278-1, © 0206, 1999, 1983 Springer Science+Business Media, LLC, 960 pages.

First Examination Report for German Patent Application No. 10 2014 018 535.4, dated Sep. 4, 2015, 5 pages.

First Official Communication, including search report, for European Patent Application No. 15 816 700.7, dated Jun. 21, 2019, 4 pages.

Japanese Office Action for Japanese Patent Application No. 2017-530198, dated May 14, 2019, 6 pages.

Office Action for Japanese Patent Application No. 2017-530198 dated Dec. 3, 2019, 5 pages.

* cited by examiner

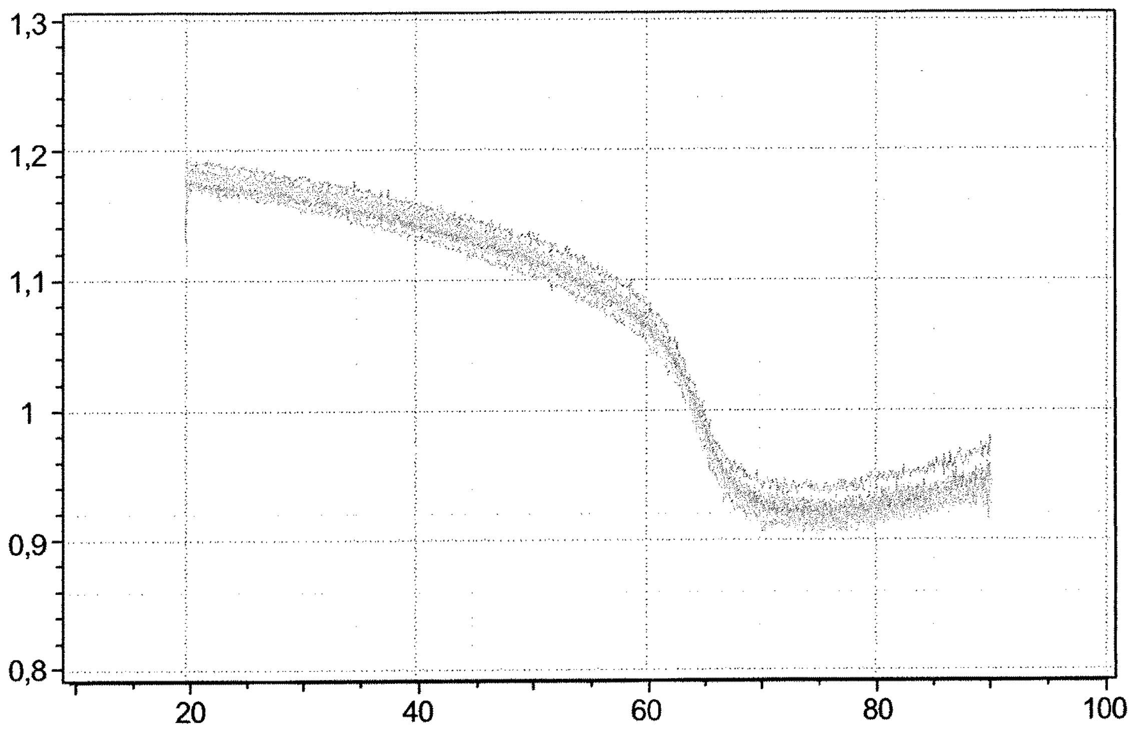
FIG. 9
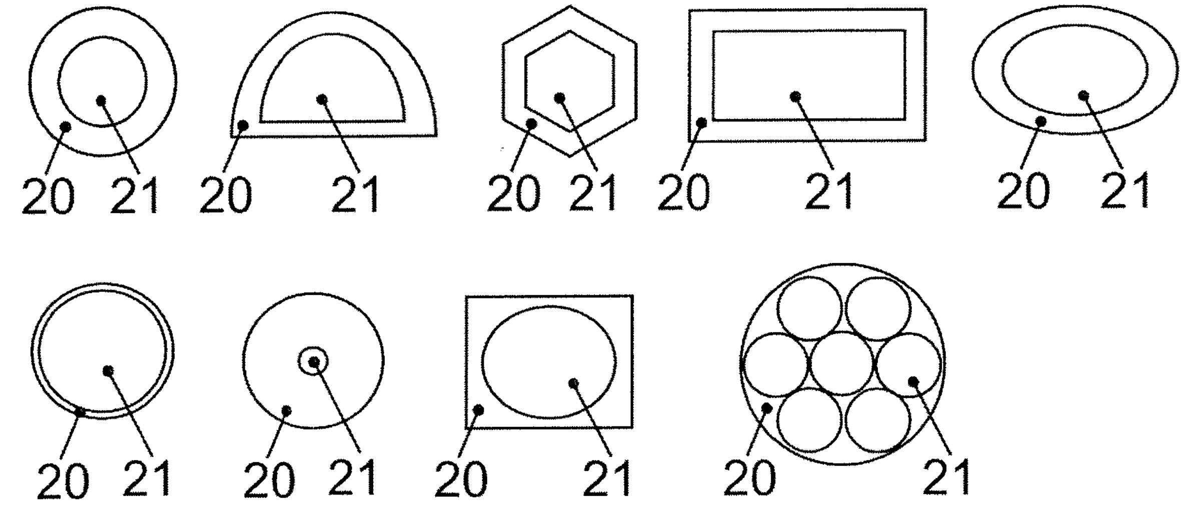
FIG. 10A FIG. 10B FIG. 10C FIG. 10D FIG. 10E
FIG. 10F FIG. 10G FIG. 10H FIG. 10I

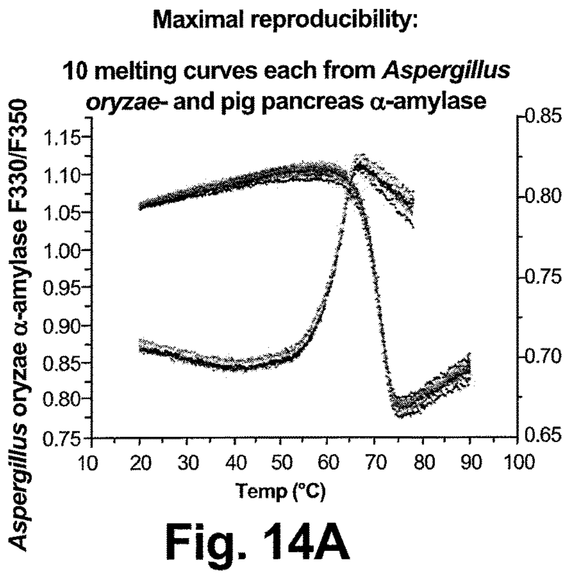
Fig. 14A
Average Tm values of α-amylase from different species
| Protein | Tm (°C) | Literature Tm value (°C) |
|---|---|---|
| *Aspergillus oryzae* | *71.3 +/- 0.20** | 70 |
| Pig pancreas | 63.6 +/- 0.17* | 65 |
*SD from 10 capillaries, Tm determined by first derivative analysis
Fig. 14B
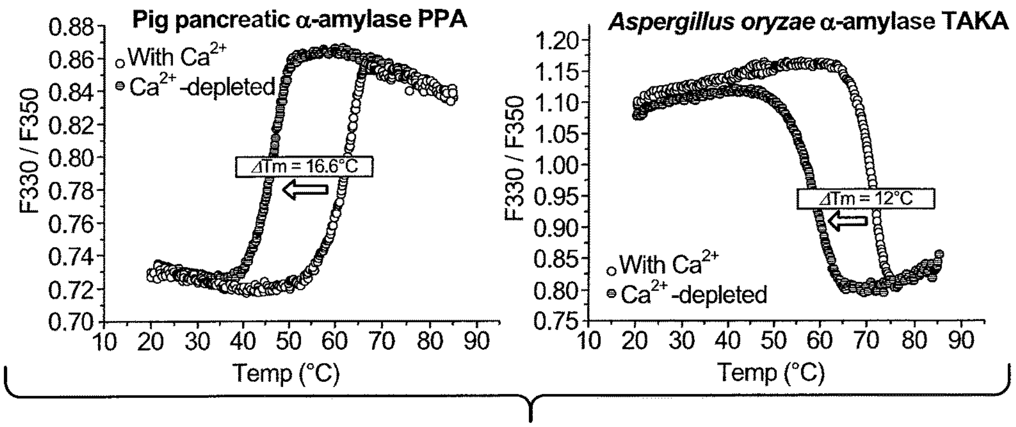
FIG. 15

METHOD AND SYSTEM FOR TEMPERING CAPILLARIES WITHOUT SEALING THEM

CROSS-REFERENCE TO RELATED APPLICATION

This Application is a Section 371 National Stage Application of International Application No. PCT/EP2015/079459, filed 11 Dec. 2015 and published as WO 2016/092086 A1 on 16 Jun. 2016, in German, the contents of which are hereby incorporated by reference in their entirety.

FIELD

The invention generally relates to a system and a method for tempering capillaries which are filled with samples to be examined. In particular, the invention relates to a method for tempering capillaries for optical measurements of tempered samples dependent on the temperature. Preferably, the optical measurement is conducted in the UV range based on fluorescence characteristics of the samples to be measured. Furthermore, the invention relates to a system by means of which the inventive method may easily and efficiently be carried out. One essential advantage of the invention is that there is no need to seal the capillaries for tempering and optical measurement of the samples within the capillaries.

BACKGROUND OF THE INVENTION

In the field of biophysics, biochemistry, biology, pharmacy, molecular diagnostics and analysis in general, samples are often exposed to different temperatures in order to characterize them according to their behavior at different temperatures.

For example, melting curve analyses, thermal stability measurements, "Thermal Shift Assays" (TFA) and Differential Scanning Fluorimetry (DSF) are important tools to qualitatively and quantitatively determine the stability and aggregation behavior of proteins and active agent formulations.

A further example is the MicroScale Thermophoresis (thermo-optical particle characterization), by means of which for examples affinities (Kd, EC50) of interactions at different temperatures are measured in order to derive the thermo-dynamic values dH and dS from the measurement results for example by means of a van't Hoff Plot.

In the field of biophysics, biochemistry, biology, pharmacy, molecular diagnostics and analysis (for example food analysis, cosmetics, . . . ) particularly aqueous solutions like buffers, lysates, urine, sera, whole blood etc. or liquids in general are used. In this respect, the temperature range to be examined extends from for example 0° C. to 100° C. or to the range in which the respective fluid is in its liquid form.

Capillaries as sample containers are of particular interest with respect to said applications since they have a particularly small and particularly well defined volume. Furthermore, capillaries may autonomously be filled with liquids by capillary forces, which makes for example the use of pumps superfluous. Furthermore, capillaries, for example made of borosilicate 3.3 quartz, synthetic fused silica, etc., are also advantageous with regard to their optical properties, in particular their transparency, purity and autofluorescence. In particular, short capillaries with a small inner diameter and a small outer diameter, for example an outer diameter of not more than 1 mm and an inner diameter of not more than 0.8 mm, preferably an outer diameter of 0.65 mm and an inner diameter of 0.5 mm, are advantageous since they only have a little volume and thus sample material can be saved.

In order to perform the described measurement methods, as for example a melting curve analysis, the capillaries have to be tempered, for example from 10° C. to 100° C. During said tempering, a high vaporization of the liquid at increased temperatures can typically be observed. Said vaporization or evaporation leads to disturbing currents in the liquid and in particular to such a high loss of liquid that measurements at increased temperatures over a longer time period are not possible.

Said vaporization may be avoided or reduced by for example sealing the ends of the capillaries with wax or by welding up the capillaries with a flame. However, said sealing methods involve significant disadvantages. Welding up the capillaries causes, in particular when quartz is used (which is advantageous for measurements with electromagnetic radiation in the UV range due to its good optical properties, in particular the low autofluorescence), such high temperatures that the molecules to be examined are changed or destroyed during welding and can thus no longer be examined. Furthermore, hardly any user has the necessary equipment to produce flames which are hot enough and defined enough to locally weld the ends of quartz capillaries in a defined manner.

Sealing the capillaries with an additional material, for example with wax, always contains the risk of contaminating the fluid/sample with the sealing material and thus to falsify the measurements. Further, it can be observed that sealings, as for example wax, may be pressed out of the capillary due to the vapor pressure in the capillary at increased temperatures and thus lose their functionality.

Systems in which capillaries are provided in the form of Micro Cuvette Arrays (MCA) are also known. Said Micro Cuvettes are put into a frame wherein said frame seals the cuvettes by means of silicon strips at both ends. In order to avoid contamination, said silicon strips and/or the frame have/has to be exchanged regularly, which causes additional costs.

However, since it is desirable with regard to biomolecules, for example proteins, peptides, nucleic acids, DNA, RNA, antibodies but also cells, bacteria, nanodiscs, vesicles, viruses etc. to work with very small volumina in the microliter range, short, very thin capillaries are advantageous. Furthermore, it is advantageous to use capillaries with thin walls, since for example autofluorescence and other artifacts may be minimized by said thin walls.

Thin capillaries with thin walls, i.e., capillaries with a small diameter and a thin wall, however, have the disadvantage of being very fragile. For that reason, the nondestructive, mechanical sealing of the capillaries, for example by a plug or a cap, is either not possible or only with significant effort which is thus no longer efficient.

Thus, there is the need of a simple or improved method by which optical measures may be carried out at increased temperatures also over a longer time period.

SUMMARY OF THE INVENTION

The inventive method as well as the inventive system are defined by the features of the independent claims. Advantageous embodiments are mentioned in the subclaims.

In particular, the present invention relates to a method by which fluids can be tempered and optically examined in a capillary without sealing the capillary. Preferably, several capillaries are simultaneously tempered and simultaneously or subsequently optically examined without sealing the capillaries. Preferred advantages of the inventive method without sealing the capillaries can be briefly described as follows. The risk that a capillary may break is significantly reduced since the risk of breaking is typically the highest or high at the time of closing the capillary. Furthermore, the working steps to seal the capillaries are not required since not every capillary has to be sealed at both ends. The solution according to the invention is thus not only faster but also less cost-intensive, i.e. more cost-efficient, and in addition, contamination due to closing material can be avoided.

The present invention relates to a method of tempering at least one, preferably a plurality of capillaries. The capillary/capillaries is/are for example arranged on a carrier for easier handling. The carrier preferably has a length L, a width W and a height H (see for example FIG. 3). Preferably, the capillaries are arranged on the carrier along the width of the carrier. Preferably, the carrier has a recess 61 in which, for example, a tempering element may be inserted. Furthermore, it is preferred that the capillaries are carried by the carrier only outside the tempering element so that the whole width of the tempering element is available for measurements. The capillaries should be tempered preferably in their central area by contact with the tempering element, wherein the ends of the capillaries which are filled with samples are not closed during tempering. Preferably, it is further advantageous to consider the arrangement of the capillaries with respect to the tempering element also with regard to the filling capacity. According to the invention, the tempering element can be warmed-up or heated and/or cooled down, wherein preferably the ambient temperature is the reference point.

According to a preferred embodiment, the temperature range of the sample in the capillary extends from for example 0° C. to 100° C. or to the respective range in which the respective fluid is in its liquid form. In other words, in case the sample is an aqueous solution and the measurement of the sample has to be carried out in the liquid phase, it is preferred to temper the sample in a range of from 0° C. to 100° C. In case the sample fluid is a fluid with a lower melting point, for example a fluid which contains other solvents, for example organic solvents, for example alcohols or substantially consists of said substances, the preferred lower limit of the tempering range may also be lower, for example below 0° C. The preferred temperature range of an aqueous solution which contains for example buffers, salts, detergents, lipids, tensides, polymers, DMSO, saccharose or glycerol may also have a larger or smaller temperature range than 0° C. to 100° C. With regard to aqueous solutions having a high content of salts and/or detergents, the preferred lower limit of the tempering range may also be lower, for example below 0° C. With respect to aqueous solutions having a high content of salts and/or detergents, the preferred upper limit of the tempering range may also be higher, for example more than 100° C.

For example, also supercooled fluids may be used according to the invention.

Furthermore, according to a further preferred embodiment, the lower limit of the tempering range for aqueous solutions may be below 0° C. or below the freezing point when freezing of the fluid is desired. Since, according to the invention, the capillaries are not sealed or not closed, temperatures below 0° C. may also be used without the capillary bursting due to the expansion of the aqueous solution (anomaly of the water). Contrary thereto, a frozen aqueous solution in a sealed capillary could cause the capillary bursting due to volume expansion. However, volume expansion is no problem with respect to the capillaries that are not sealed according to the invention, since the expansion of the frozen fluid is possible due to the lacking sealing. The inventive capillaries that are not sealed also endure repeated freezing and unfreezing processes of the aqueous solution which are for example carried out to check whether repeated freezing and unfreezing leads to the development and/or aggregation of biomolecules in the aqueous solution. Aqueous solutions with biomolecules are for example stored at −20° C. or −80° C. Before storing, said aqueous solutions with biomolecules are in their liquid form, when being stored at for example −20° C. or −80° C., said aqueous solutions freeze, for use they are again taken out of the freezer and unfrozen to use them in their liquid form again. For the denaturation/unfolding and/or aggregation of the biomolecules in the aqueous solution, not only the absolute temperature at the time of freezing is important, but also for example at which cooling down rate and warming up rate the freezing and unfreezing takes place and/or how often said process is carried out/repeated.

According to the invention, the sample to be examined is filled into a capillary, wherein the capillary is usually not filled from end to end with the fluid of the sample. The part of the capillary which is filled with the fluid of the sample is referred to in the following as liquid column. Preferably, the liquid column of the capillary is aligned to the tempering element such that both ends of the liquid column project beyond the tempering element.

Preferably, the tube-shaped capillaries according to the invention have a length of between 40-75 mm, preferably between 45-55 mm, further preferred approximately 50 mm.

The width of the tempering element is preferably between 5-34 mm, further preferred between 20-30 mm, further preferred between 20-25 mm, further preferred about 25 mm. As tempering element preferably silicon, preferably pure silicon is used.

According to particular embodiments, it may be advantageous to configure the tempering element integrally along the width or to configure several separate tempering regions along the width wherein said several tempering regions may contact each other or wherein a spacing may be configured between them.

In order to guarantee a reliable tempering of the capillaries, it may be further advantageous to press the capillary or the capillaries on the tempering element by means of a lid, in order to guarantee the contact between the capillary and the tempering element. The lid may be arranged partly above the tempering region and/or exert a force on the capillaries outside the tempering region.

According to the invention, the individual capillaries are filled with a fluid, preferably with an aqueous sample solution, in particular buffer solutions for biochemical/biological measurements. Additionally or alternatively, also non-aqueous solvents may be used or added, for example organic solvents.

Sample solutions may contain an analyte, preferably a protein, in a suitable aqueous solution, for example a buffer solution, but also in an organic solvent (for example alcohols, such as ethanol, octanol, isopropanol) or in water or in a mixture of water with one or several organic solvents (as ethanol, octanol or isopropanol).

With respect to the inventive sample solution or sample fluid which is filled into the capillaries, also oils, emulsions, dispersions or other substances or mixtures may be used which are in liquid form at least in one of the preferred tempering ranges and may be filled into the capillary.

The length of the liquid column in the capillary is preferably at least 1.1-fold of the width of the tempering element, preferably at least 1.2-fold, preferably at least 1.3-fold, further preferred at least 1.35-fold, further preferred at least 1.4-fold, further preferred at least 1.45-fold, further preferred at least 1.5-fold, further preferred at least 1.6-fold, further preferred at least 1.7-fold of the width of the tempering element.

Preferably, the capillaries have an inner diameter of 0.02 to 0.9 mm. Preferably, the capillaries have an outer diameter of 0.1 to 2 mm.

The capillaries may for example be made of glass, preferably of borosilicate 3.3 quartz, synthetic fused silica, without being limited thereto.

As is known, capillaries generally are small tubes having very small inner diameters. Capillarity, which is a physical effect, occurs in capillaries due to the surface effects, which are remarkable when compared to larger tubes. Fluids with high surface tension rise in capillaries.

Furthermore, the inventive capillaries are not restricted to a certain cross-sectional shape. Most capillaries are configured in a round shape. According to the invention, the cross-section of a capillary may also be oval, triangular, quadrangular, pentagonal, hexagonal, octagonal, semi-circle or trapezoidal, or comprise any other irregular shape.

Furthermore, according to the invention, it is preferred that the capillaries are made of a solid, preferably non-deformable material as for example glass and that the cross-sectional shape of the capillaries does not change for or during a measurement. For example, the cross-sectional shape during filling is the same as during measuring. It is preferably avoided to press the cross-section together for measuring, for example also because the inner and outer diameter of the capillaries also influences fluorescence measurements, absorption measurements, extinction measurements or diffused light measurements. Since the capillaries according to the invention are not closed on at least one side, a deformation of the capillaries may also lead to the extrusion of the sample fluid to be examined, which preferably is to be avoided.

Furthermore, the present invention relates to a method for optically examining samples filled in capillaries. First, the capillaries are filled with the sample. Then, the capillaries are positioned on the tempering element for tempering. Preferably, several capillaries are first arranged on a carrier and the carrier with the several capillaries is subsequently positioned on the tempering element. Subsequently, the capillaries may be tempered as described above. In order to carry out the optical measurement, the samples may be excited for example by light.

The excitation by light is not restricted to a certain wavelength of the light. According to a preferred embodiment, the excitation may be effected for example by UV light. Subsequently, the light emitted by the sample is measured. The present invention is not restricted to a certain wavelength also with regard to the measurement of the emitted light.

In addition to the inventive method, the present invention also relates to a system for optically examining samples in capillaries. The inventive system preferably comprises a tempering device for tempering the capillaries. Furthermore, it may be preferred to provide a carrier for carrying the capillaries. Additionally or alternatively, the inventive system may also comprise an optical measuring system for emitting light and detecting light. According to a further preferred embodiment, the system may comprise at least one capillary, preferably a capillary which is not deformable and which is tube-shaped.

The term "not deformable" particularly means that the cross-section of the capillary does not substantially change when pressure is applied. Preferably, the term "not deformable" has to be understood as "macroscopically not deformable". In particular, the capillary is preferably hard. Furthermore, it is preferred that no pressure is applied to the capillary or such low pressure that the cross-section of the capillary does not substantially change.

The inventive system may also be used for example to measure thermophoresis effects in samples.

The inventive methods and systems are in particular suitable for experiments with respect to folding and unfolding of proteins and the examination of the stability of biomolecules like proteins. Here, the structure of the biomolecule to be examined, in particular protein or protein complex, is changed by addition of suitable chemicals, for example chaotrops as urea or guanidine hydrochloride or organic solvents, or by change of the temperature (i.e. for example "melting" by increasing the temperature). The secondary and tertiary structure of biomolecules as proteins and nucleic acids is often also dependent on the presence of ligands or cofactors like ions (for example $Mg^{2+}$ or $Ca^{2+}$). This may be effected for example by measuring the fluorescence (preferably tryptophan fluorescence in case of proteins) under different concentrations of the ligands and/or cofactors.

The biomolecule, preferably protein, may be denatured chemically or thermally, and structural amendments may be measured by intrinsic fluorescence (preferably tryptophan fluorescence in case of proteins). There, for example changes in the fluorescence intensity or shifting of fluorescence maxima may be detected. The melting point of the biomolecule to be examined, for example protein, may also be determined. The melting point is the state in which one half of the biomolecule to be examined, for example protein, is folded and the other half is unfolded. In case proteins are examined, for example the tryptophan fluorescence at a wavelength of 330 nm and/or 350 nm can be measured. Here, the change of the intensity of the fluorescence, for example dependent on the temperature or on the addition of a denaturant or cofactor/ligand may be determined and/or a periodical process may be recorded. The quotient of the fluorescence intensity at 330 nm to the fluorescence intensity at 350 nm (F330/F350) is a preferred indicator. For example, the melting point may be determined from the maximum of the first derivative of the F330/F350 curve.

The melting of nucleic acids or their complexes may also be tracked by means of fluorescence measurement. In addition to fluorometric measurements, the measurement of the circular dichroism (CD) is also an option.

In addition to the thermal, chemical, enzymatic or periodical denaturation of biomolecules, in particular of proteins as for example membrane proteins or antibodies, the aggregation behavior of the biomolecules may be measured as well. The measurement of the aggregation behavior is in particular not only interesting with regard to the admission of pharmaceuticals. Said aggregation may for example be measured by changing the intrinsic fluorescence, for example changing the fluorescence intensity and/or shifting the fluorescence emission maximum. Said aggregation may for example also be measured by means of measuring the fluorescence anisotropy of the biomolecules. Preferably, measuring the fluorescence anisotropy also allows the measurement of a change of the size of the biomolecules and thus for example the size of emerging aggregates or the disaggregation of multimers of biomolecules, for example the thermally caused disaggregation of a tetramer in its four monomers.

For example, the thermally, chemically, enzymatically or timely induced changes in size of the biomolecules and thus also their aggregations or multimerization may be measured by means of light diffusion.

Possible applications for the inventive methods and systems are for example in the field of "protein engineering" (in particular "antibody engineering") or when examining membrane proteins, in the field of quality control or when developing biologics in the pharmaceutical industry.

SHORT DESCRIPTION OF THE DRAWINGS

In the following, preferred embodiments of the present invention are described, referring to the Figures, wherein:

FIG. 9 shows the quotient of both optical detection channels of FIGS. 7 and 8;

Figure 11A:
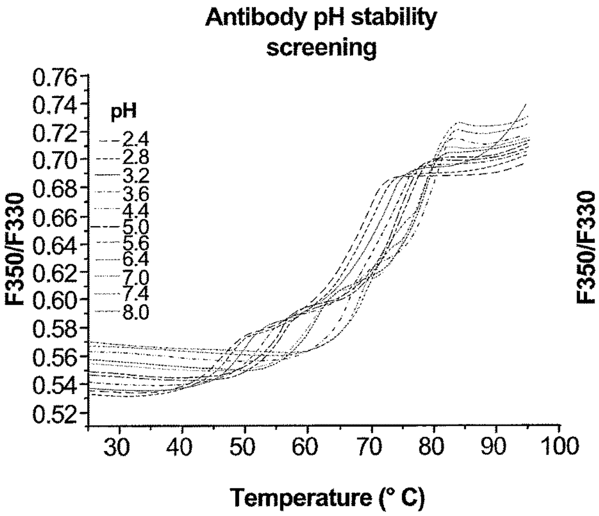
Figure 11B:
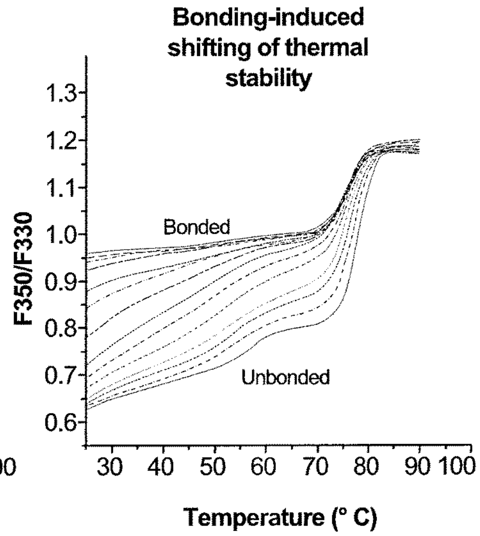

FIGS. 10*a*-10*i* show capillaries having different geometries and cross-sections;

FIG. 11A shows an example for a typical buffer screening in the field of antibody research;

FIG. 11B shows an example for a change of the thermal stability of a protein via bonding of small molecules;

FIGS. 12-17 show illustrations from an inventive embodiment; and

Figure 5:
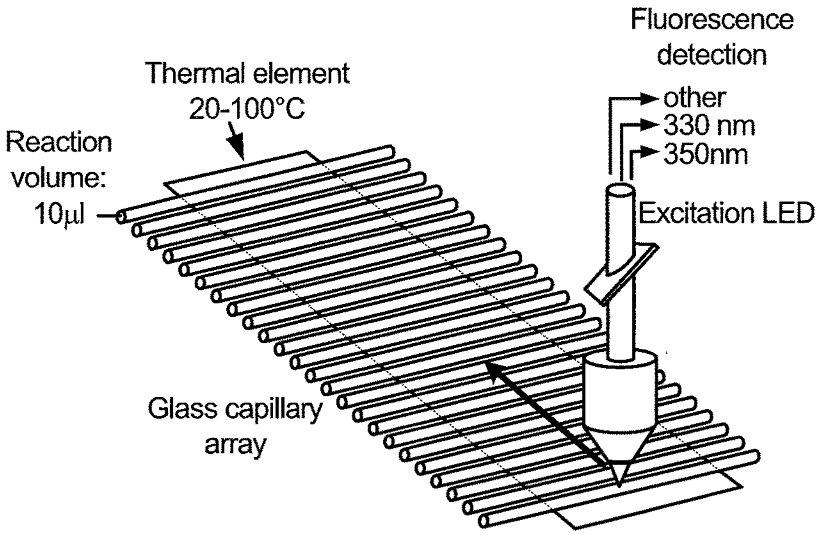
FIG. 5 shows a schematic view of an optical measurement with several capillaries on a tempering element and an optical excitation at 280 nm by means of LED.
Figure 18:
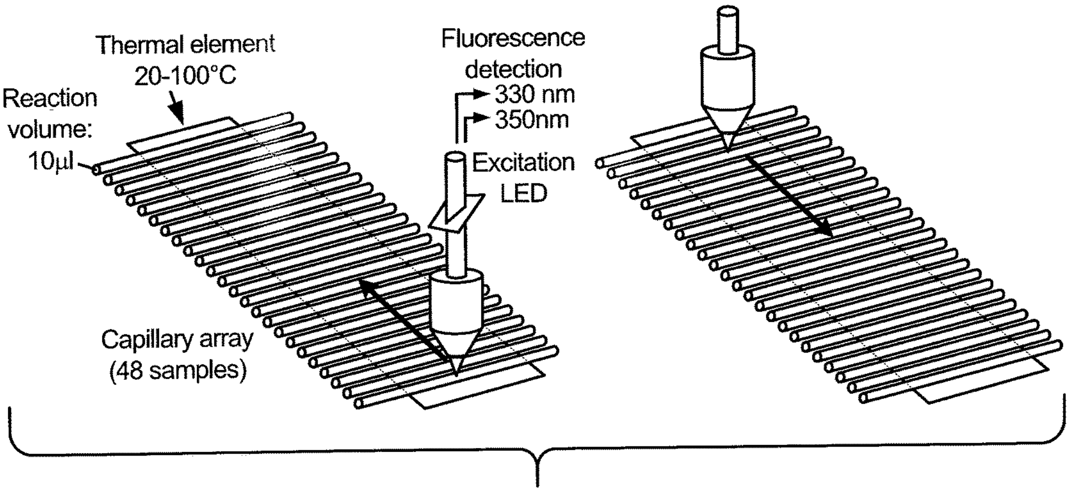

FIG. 18 shows, similar to FIG. 5, a schematic view of an optical measurement with 48 capillaries on a tempering body.

DETAILED DESCRIPTION OF PREFERRED EMBODIMENTS

The invention generally relates to a system and method for tempering a capillary, preferably several capillaries at the same time, which are filled with samples to be examined According to the invention, the capillaries are made of glass. Preferably, the capillaries are made of a material having a similar, not considerably less and/or not very/considerably higher thermal conductivity than the fluid in the capillaries. Glass is preferred also because it has a similar thermal conductivity as an aqueous solution. It is particularly preferred since the heat is transferred to the solution by means of glass, i.e. in case the thermal conductivity of the capillary material is too low, the solution in the capillaries is tempered not correctly and/or not fast enough. In case the thermal conductivity is too high, the heat is transported towards the ends of the capillary and then again leads to an increased evaporation. In the following, the thermal capacities of some materials are listed as mere examples only: polypropylene (PP) 0.23 W/(m*K); water: 0.5562 W/(m*K); glass: 0.76 W/(m*K); quartz: 1.2 W/(m*K) to 1.4 W/(m*K); steel: 48 W/(m*K) to 58 W/(m*K).

Dependent on the measurement or the measurement period, also materials having thermal conductivities which significantly differ from water may be used according to the invention. Hence, it is in principle preferred to use a material for the capillaries which is in the range of 0.15 W/(m*K) to 60 W/(m*K). Hence, for example raw materials like PMMA/plexiglass, polypropylene, PEEK and teflon are in the region of the lower limit. A further preferred range for glass as material is dependent on different types of glass and extends from for example 0.5 W/(m*K) to 1.6 W/(m*K).

The capillaries may be made of glass and/or a polymer and/or at least one of the elements of borosilicate glass, borosilicate-3.3-glass (for example DURAN® glass), quartz glass as SUPRASIL®, INFRASIL®, synthetically manufactured quartz glass, soda-lime glass, Bk-7, ASTM Type 1 Class A glass, ASTM Type 1 Class B glass. The polymers may contain: PTFE, PMMA, ZEONOR™, ZEONOEX™, Teflon AF, PC, PE, PET, PPS, PVDF, PFA, FEP and/or acryl glass.

It is particularly preferred that at least one region of the capillaries is light-transmissive for light having a wavelength of 200 nm to 1000 nm, preferably of 250 nm to 900 nm. Particularly preferred, but not limited to, is said at least one region also transparent for light of the following wavelength ranges: from 940 nm to 1040 nm (preferably 980 nm+/−10 nm), from 1150 nm to 1210 nm, from 1280 nm to 1600 nm (preferably 1450 nm+/−20 nm and/or 1480 nm+/−20 nm and/or 1550 nm+/−20 nm), from 1900 nm to 2000 nm (preferably 1930 nm+/−20 nm). The skilled person understands that the transparent region(s) may also extend over the complete tube-like structure. In other words, the capillary may be transparent.

Light transmission of the segment allows carrying out measurements of luminescence/fluorescence/phosphorescence and/or optical examinations/measurements (for example interference, polarisation, absorption, dichroism, ellipsometry, anisotropy, Raman, microscopy, dark field, light diffusion, FRET, MicroScale Thermophoresis, thermo-optical particle characterization) and/or manipulations of the solution/liquid in the cavity of the capillary. Light transmission can further allow carrying out fluorescence measurements. According to a preferred embodiment, light transmission also makes the heating of fluids in the tube-like structure possible by means of electromagnetic radiation, for example light (preferably an infrared (IR) laser), preferably the heating of water and/or organic solvents.

According to the present invention, the capillaries preferably come into contact with a tempering element so that a temperature exchange from the tempering element to the capillaries and thus to the samples in the capillaries is effected. Preferably, the capillaries are tempered by means of contact heat in the region in which also the optical measurement is carried out. In said region, the heat contact may for example be improved by applying oil, for example immersion oil. Preferably, the optical measurement is not limited to a certain wavelength region and may for example be carried out in the IR, visible or UV range. It is further desired that the temperature element itself does not send any or only little portions of fluorescence which could distort the measurement of the sample. According to the invention, preferably silicon is used as contact material for the tempering element, i.e. the element which comes into contact with the capillary/capillaries and transmits the temperature to the capillaries by direct contact.

The use of silicon has a plurality of advantages, only some of which are exemplarily listed here. First, silicon does not have any or only an extremely low autofluorescence, in particular at an excitation light in the range of 260 nm to 700 nm. A typical measurement of the tryptophan fluorescence involves for example the excitation at 260 nm to 300 nm and measures the emission at >320 nm. Thus, silicon is very suitable for measuring fluorescence, in particular also for fluorescence measurements in the UV range (tryptophan, tyrosine, phenylalanine fluorescence). The UV fluorescence range is particularly advantageous since in this way native biomolecules can be measured by means of their intrinsic fluorescence without having to modify them for example by means of a dye. Without the inventive use of silicon, an air gap was required in the prior art in order to avoid autofluorescence effects. Consequently, just the region which needs to be optically measured by means of fluorescence is not well tempered. According to the invention, the measurement region in the capillary can directly be heated/cooled (tempered) by means of non-fluorescent silicon.

Furthermore, silicon can be produced and purchased in high purity so that a possible autofluorescence of decontaminations and thus a manipulation of the measurement results are extremely low. Moreover, silicon is a chemically inert material so that also a possible contact with a fluid to be measured does not evoke any reactions which negatively influence the optical measurement. A contact surface made of silicon for a tempering element may be produced very smooth so that the surface which is in contact with the capillaries may be produced as reflecting surface, by means of which the excitation light and/or fluorescence light of the sample may be reflected by the reflecting surface, which may additionally lead to an enhancement of the measurement signal. The reflecting surface is also broad-band, which is additionally advantageous. Further, silicon is very heat conductive and very smooth. Electronic “circuits/structures” may for example be integrated in the silicon, for example by means of doping and/or etching. Said structures can for example be used to measure one temperature or several temperatures.

A further exemplary material for use as contact material is metal, preferably anodized metal, preferably anodized aluminum. Hence, there is for example anodized aluminum, for example in black, which does not have any autofluorescence in the UV range. Contrary to anodized aluminum, silicon has the advantage of being highly pure since the quality of anodizing may often vary.

The tempering element itself is preferably tempered by a tempering means. In other words, the tempering element preferably has the only purpose of specifically transferring the temperature or heat to the capillary/capillaries. The present invention is not limited to specific tempering means. For example Peltier elements are suggested due to their compact construction technique and their appropriate temperature range. However, also electric heating elements or heating coils which may be tempered by means of fluid may be used as tempering means.

The capillaries to be tempered have to be arranged in such a way that at least one part of the capillaries is in contact with the tempering element. Preferably only a central region, preferably a region in the middle of each capillary is in contact with the tempering element, i.e., it is preferred that at least one end, further preferred both ends of the capillary is/are not in contact with the tempering element during tempering. In the present application, central region or center of the capillaries relates to the length of the capillary, i.e. in the center between both ends. In other words, it is preferred that one end, preferably both ends is/are not tempered.

According to preferred embodiments, the capillaries have to be carried in such a way that each capillary is tempered only within a narrow tempering region. According to a preferred embodiment, the capillaries are arranged in such a way that both ends project beyond the tempering element, preferably project symmetrically, so that the ends of the capillaries are not tempered by the tempering element. According to a further preferred embodiment, the individual capillaries are longer than the tempering region by the value dx.

Thus it can be guaranteed that the capillaries are tempered only over a determined portion of their length, which, in combination with the low heat conductivity of glass capillaries, leads to the effect that the ends of the capillaries practically always have room temperature if there is sufficient distance to the tempering region or to the tempering element. That means even if the center or the central region of the capillary is tempered to 90° C. by means of the tempering element, no higher evaporation than at room temperature can be observed at the ends of a correspondingly long capillary. That means that sealing is not required when the evaporation at room temperature is acceptable.

With respect to capillaries having a length of 50 mm, the tempering region for example has to be preferably smaller/shorter than 32 mm, further preferred shorter than 25 mm, i.e. not more than 25 mm of the length of the capillary should be centrally tempered. In other words, on both sides of the tempering region preferably a length of 12.5 mm of the capillary which is not tempered should project.

1 mm is defined to be the lower theoretical limit of the tempering region, wherein the length is preferably not smaller than 5 mm for practical reasons. The examples of the present invention are discussed with a width of the tempering region of 25 mm, wherein said width is preferred. However, it turned out that also a tempering region with a width of 20 mm works fine or is easy to handle. Also a tempering region of 30 mm is still easy to handle.

The examples of the present invention are discussed with a capillary length of 50 mm, wherein said length is preferred. However, it turned out that also capillaries having a length of 20 mm, 25 mm, 30 mm, 35 mm, 45 mm work fine and are easy to handle. Similarly, capillary lengths of 55, 60, 65, 70, 75 and 80 mm are still easy to handle.

Since little concentrations of samples/substances are used, the disturbing autofluorescence of the material of the tempering elements known from the prior art is often much higher than the fluorescence of the sample itself, i.e. the measurement is not possible. Measuring directly on pure raw aluminum/on aluminum as a base is almost impossible. Thus, below the region in which it is measured, there had always to be a recess/measuring gap/air gap in the prior art. Said recess 61, however, caused the capillaries to adopt another temperature just in said recessed region than in the region in which they rest and by which they are tempered. Said effect in the prior art is explained by the following two examples.

A) The room temperature/device temperature/ambient temperature is assumed to be 25° C. The tempering device is adjusted at 20° C. The region of the capillary which directly rests on the tempering device has approximately 20° C. The region of the capillary measured above the recess 61 had partly 22° C. with additional inhomogeneous distributions of the temperature.

B) The ambient temperature is again assumed to be 25° C. The tempering device is now adjusted at 90° C. The region of the capillary which directly rests on the tempering device has approximately 90° C. The region of the capillary which is measured above the recess 61 has approximately 82° C.+ and an inhomogeneous temperature (depending on the width of the air gap).

In the framework of the present invention several evaporation experiments with capillaries having different inner diameters and outer diameters were conducted. A tempering element having a width of 25 mm was used as test station. Capillaries having a length of 50 mm were used.

For each measurement two solutions were used: MST buffer with TWEEN® 20 (for better measurability blue dye was added) and MST buffer without TWEEN®20 (for better measurability green dye was added).

MST buffer (kinase buffer) without TWEEN®
–50 mM Tris-HCl
–150 mM NaCl
–10 mM MgCl2
–pH 7.8
With TWEEN®:
+0.25% TWEEN®20

The test capillaries were tempered as follows: Increasing the temperature from 20° C. to 90° C. with a heating rate of 1° C./min and then resting for 30 minutes at 90° C. This is an exemplary progress for a melting curve measurement/measurement for examining the thermal stability of a capillary.

| Result Round capillaries, length of 50 mm | MST buffer | Evaporation in [%] Tempering Width of 25 mm | Evaporation in [%] Control group at room temperature |
|---|---|---|---|
| ID 0.5 mm, OD 0.65 mm borosilicate 3.3 | with Tween ®<br>without Tween ® | 9.78<br>7.57 | 10.67<br>8.00 |
| ID 0.5 mm, OD 1.00 mm borosilicate 3.3 | with Tween ®<br>without Tween ® | 9.90<br>8.12 | 11.33<br>7.67 |
| ID 0.2 mm, OD 1.00 mm borosilicate 3.3 | with Tween ®<br>without Tween ® | 9.04<br>8.55 | 8.33<br>8.00 |
| ID 0.8 mm, OD 1.00 mm borosilicate 3.3 | with Tween ®<br>without Tween ® | 10.00<br>6.91 | 10.00<br>8.00 |
| ID 0.100 mm, OD 0.360 mm synthetic quartz glass | with Tween ® | 7.34 | 6.86 |

| | | | |
|---|---|---|---|
| ID 0.5 mm × 0.5 mm | with Tween ® | 12.79 | 14.00 |
| ID 0.02 mm × 0.2 mm | with Tween ® | 13.12 | 11.70 |

The tests were conducted with capillaries having different inner diameters (ID) and different outer diameters (OD). With respect to round capillaries having an inner diameter in the range of 0.1 mm to 0.8 mm, practically no significant dependence on the inner diameter can be observed.

With respect to rectangular capillaries (very thin walls, therefore no value of an outer diameter is given or outer diameter is not known), a slightly higher evaporation can be measured, which is, however, still acceptable, i.e., the fact is that with respect to rectangular capillaries practically no difference between the tempered capillary and the non-tempered capillary can be measured at room temperature (=control group).

In order to guarantee contact between the capillaries and the tempering element it is preferred to press the capillaries against the tempering element. This may for example be achieved by means of a lid. Preferably the same applies to the lid which suppresses the capillaries and thus provides for good tempering: it should not be wider than 25 mm either. In case the tempering region of the tempering element is to be widened, longer capillaries are needed in order to avoid or prevent extensive evaporation at the ends of the capillaries. Longer capillaries may be inappropriate since they involve a larger wastage of samples.

However, the tempering region should not be too narrow either since then the capillaries are no longer consistently tempered in their central measurement region or differently tempered molecules diffuse into the measurement region from the outside.

Thus, upper and/or lower limits regarding advantageous widths of the tempering element and/or lengths of advantageous capillaries and in particular their mutual dependence was determined in experiments.

Figure 1:
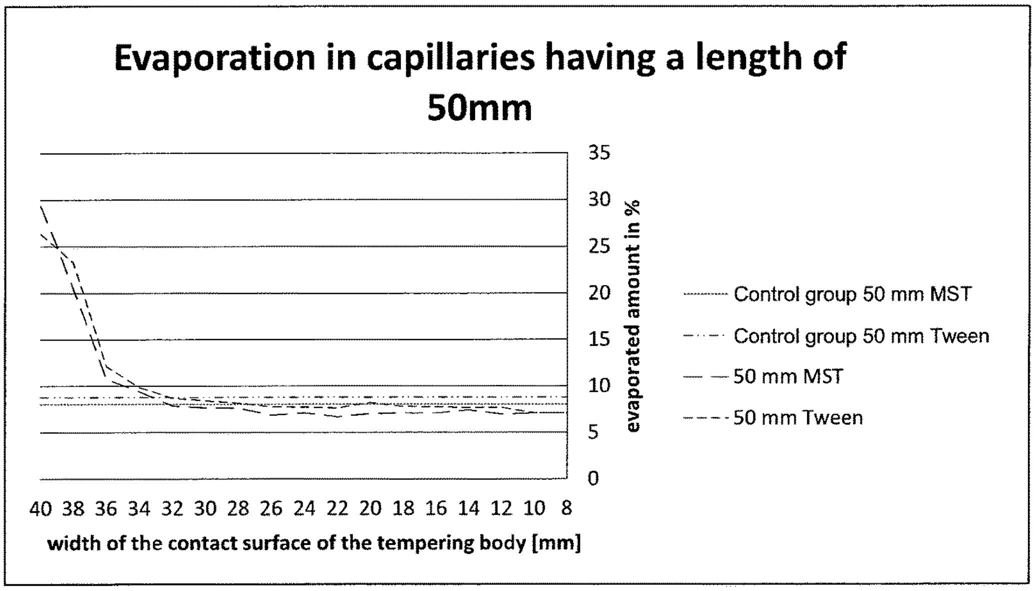
FIG. 1 shows a diagram of evaporation in percent when using a 50 mm capillary depending on the width of the contact surface of a tempering body/tempering element.

FIG. 1 shows a diagram in which the evaporation in a capillary having a length of 50 mm and an inner diameter of 0.5 mm and an outer diameter of 0.65 mm was examined. The diagram shows the evaporation in percent (y-axis) dependent on the width of the tempering element.

In said examinations a typical buffer solution without detergent (="MST") and the same buffer solution with detergent (="TWEEN®") were examined. The examinations were conducted with and without detergent since a detergent may influence the evaporation behavior. The control group was not tempered. The tempering of the other group corresponded to a typical melting curve: i.e. increasing the temperature from 20° C. to 90° C. within 70 minutes with a subsequent pausing time of 30 minutes at 90° C.

Thus, it can for example be observed that an evaporation between 25-30% occurs when using a tempering element (tempering body) having a width of 40 mm. When using a width of approximately 36 mm, the evaporation is already in the range between 10-15%. In case the width is 34 mm or less, evaporation is below 10% and comparable to an evaporation without tempering element. That means it is obvious that from a width of the tempering region of approximately 30 mm and up, the samples of the control group without tempering and the tempered samples are identical (evaporation is minimal). In particular, an evaporation <10% is usually acceptable, i.e. when the evaporation is <10%, sealing is preferably not needed.

Based on that examination, a preferred width of the tempering region for capillaries having a length of 50 mm is less than 30 mm, preferably less than 25 mm, which also makes higher temperatures possible, as for example 100° C. It is obvious for a skilled person that the maximum temperature depends on the fluid, in particular on the boiling point of the fluid or solvent. In particular, also the formation of air bubbles when reaching the boiling point is possibly disadvantageous for optical measurements. Thus, the upper limit for aqueous solutions is preferably 100° C.

Figure 2:
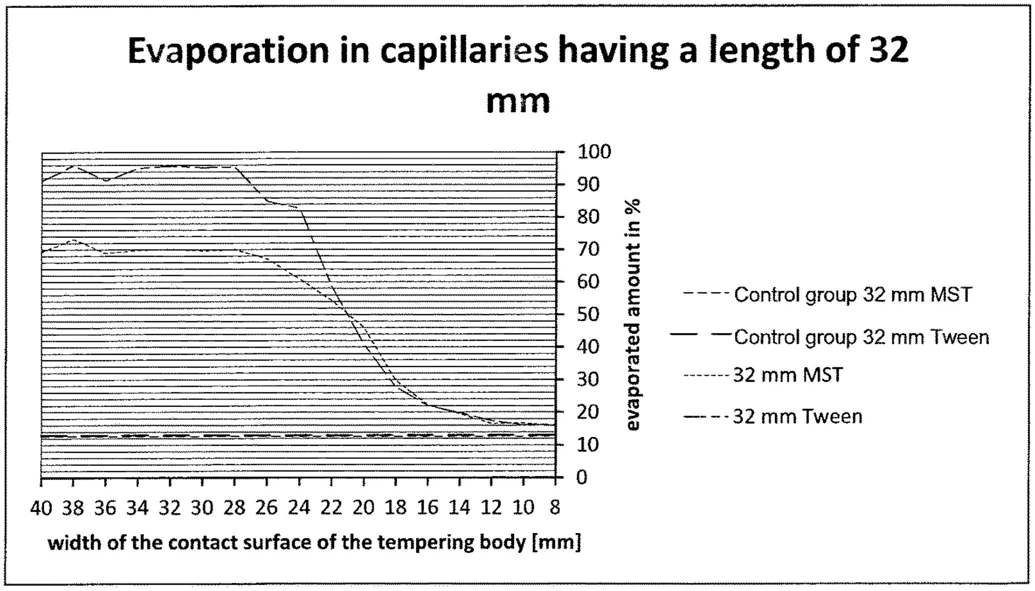
FIG. 2 shows, similar to FIG. 1, a diagram of evaporation in percent depending on the width of the contact surface of a tempering body/tempering element, however, when using a capillary with a length of 32 mm.

FIG. 2 shows a diagram in which the evaporation in a capillary having a length of only 32 mm and an inner diameter of 0.5 mm and an outer diameter of 0.65 mm was examined Again, a typical buffer solution without detergent (="MST") and the same buffer solution with detergent (="TWEEN®") was examined. The control group was not tempered. The tempering of the other group corresponded to a typical melting curve: i.e. increasing the temperature from 20° C. to 90° C. within 70 minutes with a subsequent pausing time of 30 minutes at 90° C. It can very obviously be noticed that when using a short capillary having a length of 32 mm, it is practically not possible to control the evaporation without sealing. Even when the width of the tempering region is 8 mm, an evaporation of more than 10% can be observed.

Figure 3:
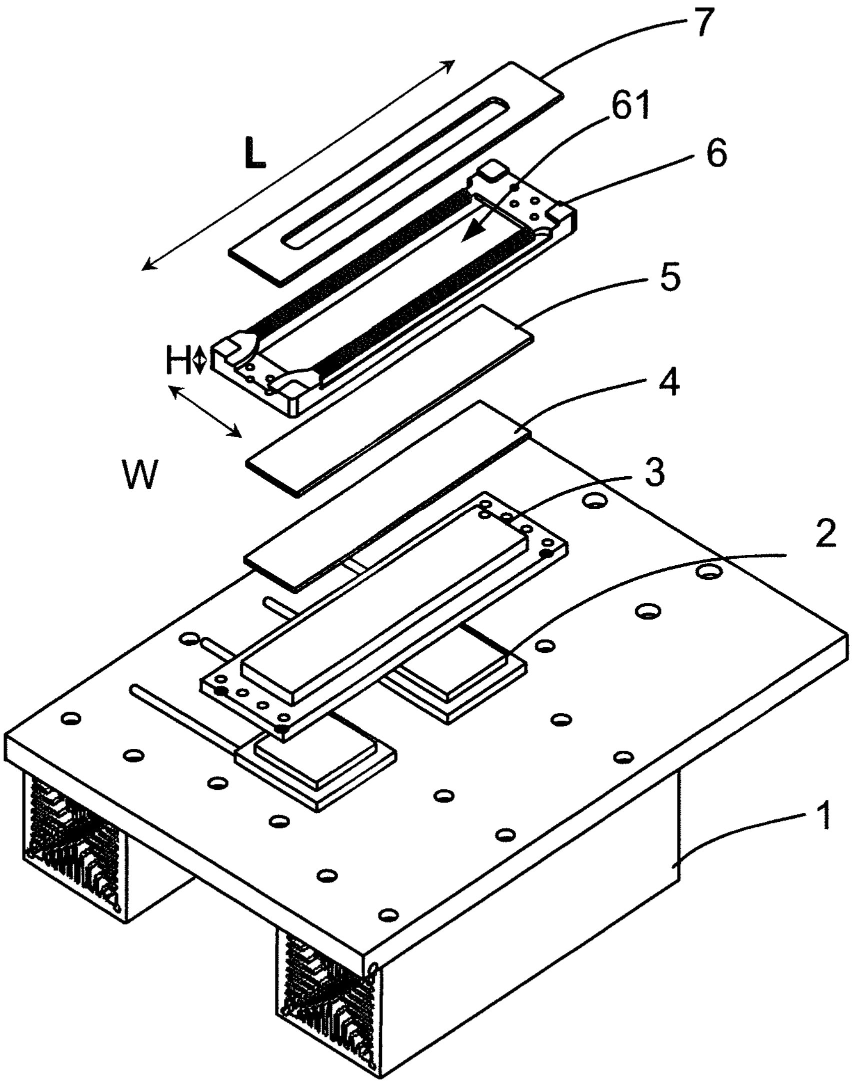
FIG. 3 shows an exploded view of a tempering device with a carrier for carrying the capillaries.

FIG. 3 shows an exploded view of a means for inventive tempering. At the bottom, cooling bodies 1 are arranged in order to discharge waste heat. The cooling bodies 1 are for example arranged on a movable member. Preferably at least one thermally conductive foil or thermally conductive paste is provided between the cooling body 1 and the Peltier element 2 in order to achieve high thermal conductivity. A heating block 3 made of metal (for example aluminum or copper) is arranged above the Peltier element 2. Preferably a thermally conductive foil or thermally conductive paste can be provided therebetween. Above the heating block 3, a preferably thin and narrow silicon wafer 5 is arranged for tempering the capillaries by means of contact. Between the heating block 3 and the silicon wafer 5 preferably a special thermally conductive foil 4 is arranged. Around the silicon wafer 5, a synthetic frame 6 (here MAKROLON®) is arranged in order to position the capillaries (not shown). Frame or carrier 6 has a length (L), width (W), and height (H).

Finally, a narrow, thin lid 7 having a measurement gap for optical measurements is put on the top. Said lid 7 should preferably not be wider than the silicon wafer 5. Preferably, the lid 7 presses the capillaries on the silicon wafer 5. It is further advantageous when the lid 7 functions in a thermally isolating manner.

Figure 4:
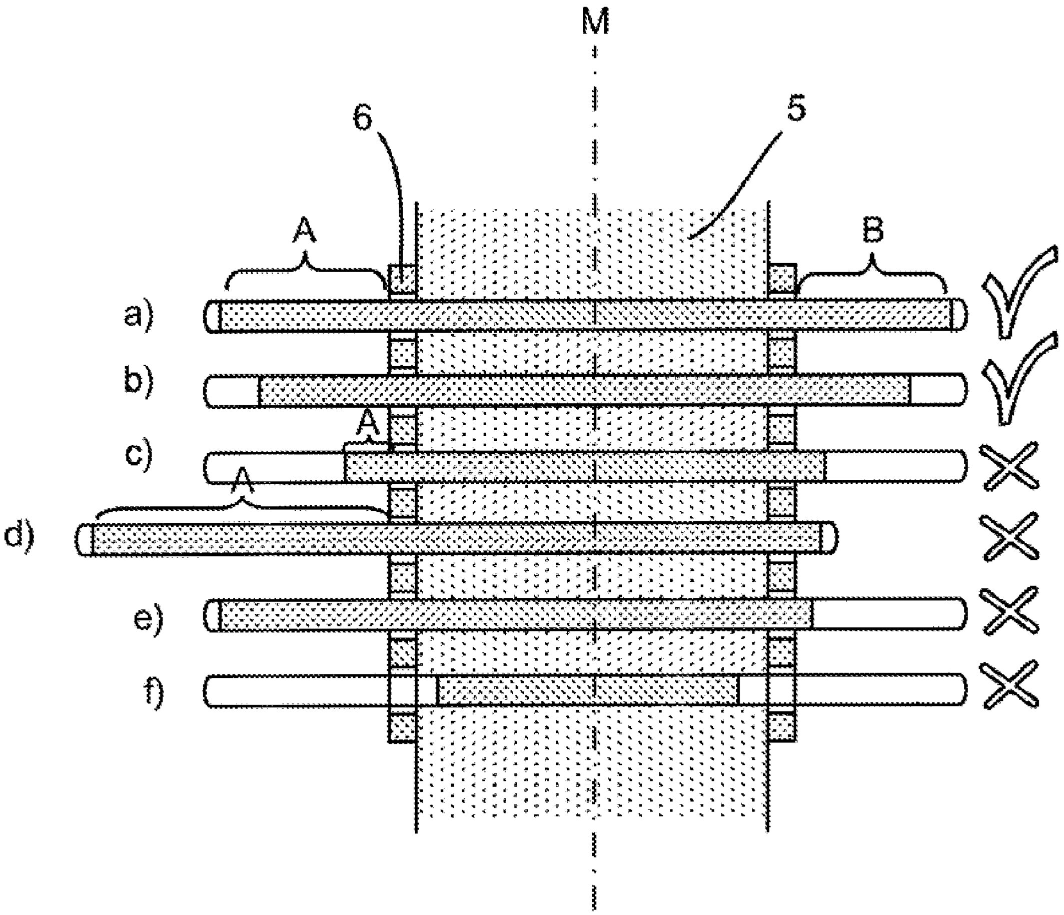
FIG. 4 shows a schematic top view on six different capillaries having a different filling level and being located on a tempering element.

The capillaries have to be positioned centrally on the synthetic frame 6 (i.e. the capillaries project sufficiently far on both sides in order to achieve minimal evaporation). FIG. 4 for example shows a schematic top view on six capillaries 10 *a)-f)* with different levels of filling and different positions, which rest on the synthetic frame/carrier 6 in order to be tempered by a silicon wafer 5 arranged below them. The six capillaries in the positions a)-f) all have identical or substantially identical lengths. Position a) shows the capillary centered, i.e. centered with respect to the central axis "C" of the frame 6 or the silicon wafer 5. The capillary is approximately completely filled, i.e. the capillary is sufficiently filled with fluid and projects beyond the frame 6 symmetrically to the left and to the right.

Position b) also shows a capillary which is arranged symmetrically around the central axis C. The filling level of said capillary is lower than in position a), however, still sufficient that evaporation at the ends does not negatively influence also a longer measurement.

Position c) shows similarly to positions a) and b) a symmetrically filled capillary, the filling level of which is, however, still lower than in position b) so that on the left and on the right side only a small projection "A" of the liquid column projects beyond the frame 6. Said small projection, however, causes evaporation at the ends, which may negatively influence an optical measurement in the region of the silicon wafer 5. Correspondingly, only positions a) and b) have been provided with checkmarks, i.e. this position and filling level work without problems, whereas positions c)-f) may cause problems. The filling level in position d) is sufficient and comparable to position a), however, the positioning with respect to the silicon wafer 5 is in a way that the projection on the right side (B) is not wide enough. The capillary is correctly arranged in position e), i.e. symmetrically with respect to the silicon wafer 5 or the central axis C, however, the capillary is filled inconsistently. The distance A on the left side from the end of the liquid column to the frame or to the tempered silicon wafer 5 is sufficiently large, whereas the distance B on the right side is too small. Finally, position f) shows a symmetrically arranged capillary having a symmetrically arranged liquid column, however, having a filling level which is too low.

In the following an optical measurement according to the present invention is exemplarily described.

The samples to be measured are filled into capillaries. This may be achieved by capillary forces or the capillaries are for example filled by a pipette, however, without being limited thereto. Then, the capillaries are placed on a carrier. Subsequently, the carrier with the filled capillaries is put on the inventive tempering element. Preferably, the capillaries are filled at least in a central region of the capillaries over a length which is wider than the width of the tempering element. The measurement of the samples should be conducted by means of fluorescence measurement. Therefor, the sample first is excited by means of an excitation LED in the UV range, for example at 280 nm.

At the beginning of the measurement, an optical member is moved to the measurement position. The samples are tempered by means of the tempering element. Preferably, the temperature is brought to the end temperature via a determined ramp. In the meantime, the samples are constantly moved below the optical member, thereby reading the fluorescence values (see FIG. 5). In this example, the fluorescence emission was measured to be 330 and 350 nm. Thus, there are fluorescence values in two wavelength regions against the temperature. As soon as the end temperature is achieved, the measured data are saved, the tempering and the light diode are switched off and the axes moved to the off position.

After a measurement is finalized, a data base file with the measured data is prepared. The data base is converted to a CSV file ("comma-separated-values") with a conversion software and subsequently imported into an analysis software. Said analysis software is able to automatically calculate the melting points by means of an inflection point analysis. By forming the quotient of both fluorescence channels 330 nm and 350 nm, a sigmoid curve results (FIG. 9).

Figure 6:
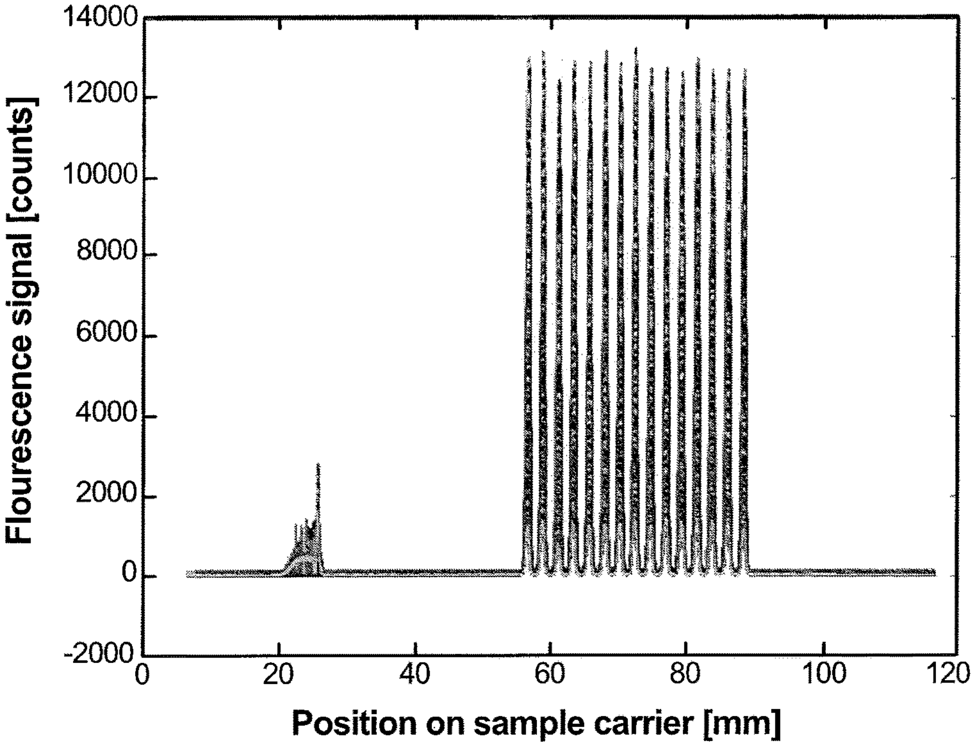
FIG. 6 shows a measurement diagram generated by means of an optical measurement according to FIG. 5, wherein each peak corresponds to a capillary.

In FIG. 6, a total of 15 samples was analyzed. Each color shows the fluorescence intensity corresponding to a specific temperature. Due to the extensive number of colors, the extensive number of measurement runs and thus also the high temperature definition can be observed, since each measurement run represents a temperature. The upper-most tip of a measurement curve represents the fluorescence signal at the starting temperature and the lower-most curve (here light blue) represents the fluorescence signal at the end temperature of a measurement. The low autofluorescence of silicon (base line) can also be observed very clearly.

Figure 7:
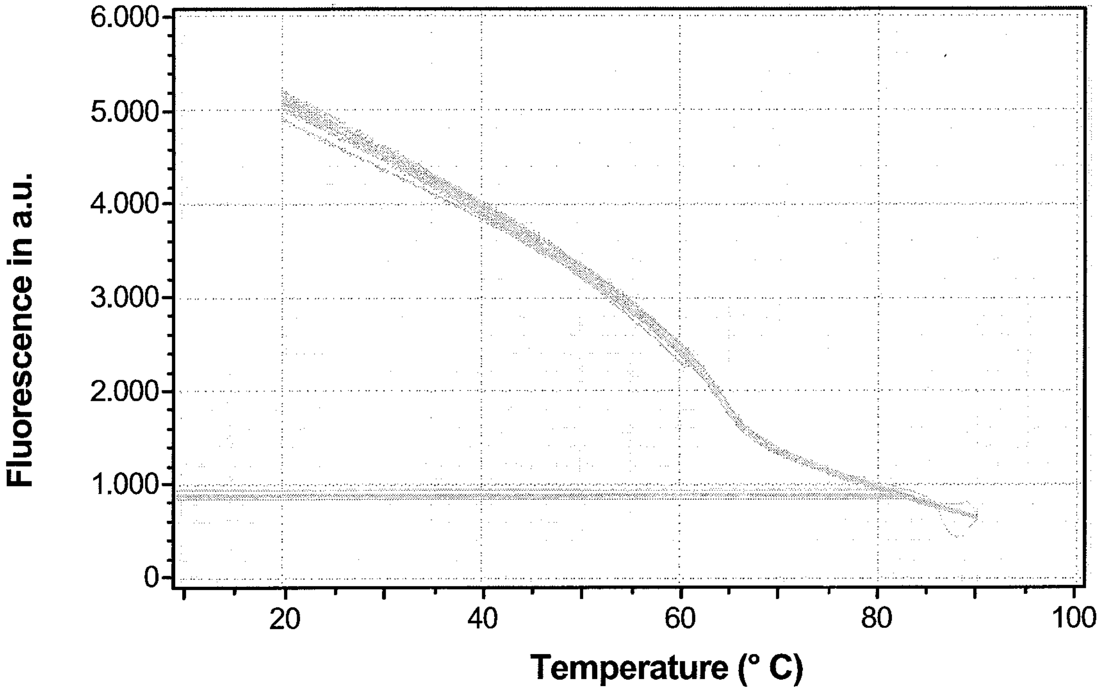
FIG. 7 shows the progress of a melting curve having an emission window of 330 nm.
Figure 8:
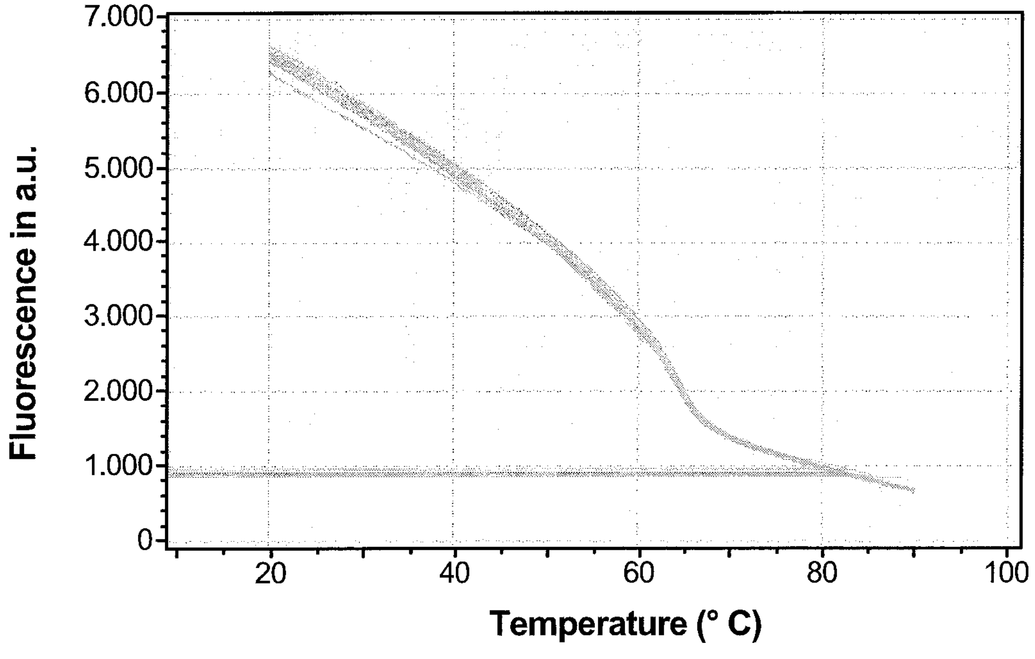
FIG. 8 shows the corresponding progress of the melting curve according to FIG. 7, however, having an emission window of 350 nm.

The separate curve progressions for both channels 330 nm (FIG. 7) and 350 nm (FIG. 8) may also be displayed. By forming the quotient of both channels 350 nm/330 nm, one receives a so-called "melting curve"/"denaturation curve" (FIG. 9). The melting point of the examined protein lies at the inflection points of the corresponding measurement curve.

Finally, FIGS. 10*a*) to 10*i*) show examples of possible cross-section shapes of capillaries. FIG. 10*a*) shows a round capillary having the wall 20 and the hollow or cavity 21. FIGS. 10*f*) and 10*g*) also show round embodiments, however, with different wall thicknesses and correspondingly different cavities while having identical outer diameters. FIG. 10*b*) shows a semicircular embodiment; FIG. 10*c*) shows a hexagonal embodiment; FIG. 10*d*) shows a quadrangular embodiment; FIG. 10*e*) shows an oval embodiment; FIG. 10*h*) shows an example for an embodiment in which the outer shape differs from the inner shape, here having a quadrangular outer shape and an oval or round inner shape and FIG. 10*i*) shows a combination with several cavities within an outer shape.

FIG. 11A shows an example for a typical buffer screening in the field of antibody research. By the unfolding of a protein/biomolecule, the maximum of the fluorescence emission shifts from the spectral range of 330 nm+/−5 nm to the spectral range of 350 nm+/−5 nm. That shifting is made clear by measuring and recording the ratio of fluorescence at 350 nm divided through the fluorescence at 330 nm. The change of the tryptophan emission (F350 nm+/−5 nm divided through F330 nm+/−5 nm) of an antibody by unfolding at increased temperatures is shown here. The thermal unfolding of the shown antibody at pH values of <pH 7 occurs at significantly lower temperatures, which suggests a destabilization of the antibody under acid conditions.

FIG. 11B shows an example for a change of the thermal stability of a protein by bonding of small molecules. It shows the change of the tryptophan emission (F350 nm+/−5 nm divided through F330 nm+/−5 nm) of a protein by unfolding at increased temperatures after bonding of different amounts of a low-molecular ligand. The more ligand is added, the more ligand bonds to the protein and the more thermally stable the protein becomes. The inventive apparatus as well as the inventive method preferably comprise one or more of the following features, in particular with regard to nano DSF applications. In particular, ultra-high resolution protein stability measurements can be conducted therewith.

Preferred features

Native DSF: no dye required

Dual-UV system: 330-nm and 350-nm fluorescence is detected 48 samples each

Ultra-high resolution: measuring of 48 capillaries in 7 seconds and observing more unfolding transitions Wide range of concentrations: from 5 μg/ml to 150 mg/ml Temperature range: from 15° C. to 100° C.

Thermal and chemical denaturation

Maintenance-free instrument and/or

Easy handling: easy preparation of samples and software having an intuitive user interface The apparatus, referred to in the following as PROMETHEUS™ NT.48, may accommodate 48 capillaries. Preferably, the capillaries are filled with the sample by means of capillary forces. Thus, the capillaries are simply immersed into the sample and then arranged within the instrument. The instrument is preferably maintenance-free and does not contain any tubes, valves or pumps. Since the capillaries are intended for one use only, no equilibration or cleaning is required.

No assay development or cumbersome sample preparation is necessary for thermal unfolding experiments. The capillaries are simply immersed into the protein solutions and loaded into the capillary carrier. A detection scan with high speed is conducted in order to determine optimum excitation and detection adjustments. Subsequently, simply the temperature ramp is adjusted and the experiment is started.

Buffer and formulation screenings may be carried out easily by mixing the protein with the solutions of interest. Capillary filling means are available in order to fill capillaries from microtiter plates within seconds. Sample annotations may easily be added during the experiment runs. For chemical unfolding experiments, different concentrations of denaturant are mixed with the protein of interest and incubated for equilibration. The samples are filled in capillaries and then analysed by PROMETHEUS™ NT.48.

Scanning a chemical denaturation series with 48 samples takes for example only 7 seconds.

Nano DSF is an advanced method for differential scanning fluorometry in order to measure the protein stability with ultra-high resolution by means of intrinsic tryptophan fluorescence in applications in the fields of antibody engineering, membrane protein research, formulation and quality control.

With the apparatuses of the invention, the nano DSF technology is available, which is the method of choice for the simple, fast and exact analysis of protein folding and protein stability in applications in the field of protein engineering, in the formulation development and quality control.

By tracking changes of the fluorescence of the amino acid tryptophan, chemical and thermal stability may be assessed in a really marker-free manner. Further, a preferred dual-UV-technology makes on-the-fly-fluorescence detection possible, which causes unexcelled scanning speed and data point concentration and thus an ultra-high resolution of unfolding curves, due to which even smallest unfolding signals may be detected.

Since furthermore no secondary reporting fluorophores are required, protein solutions may be analyzed independently from buffer combinations and over a maximum protein concentration range, preferably from 150 mg/ml to only 5 μg/ml, due to which membrane proteins solubilized by detergents and also highly concentrated antibody formulations may be analyzed.

Popular methods for quantifying the stability of a protein structure are thermal and chemical unfolding experiments. Whereas thermal unfolding experiments use a constantly increasing temperature in order to monitor protein conformation changes in the temporal course, chemical unfolding experiments use concentration gradients of buffer additives, usually chaotrops, for example urea, to unfold proteins in different levels.

Many proteins thermally unfold over a narrow range of temperature. The center of the transition from folded to unfolded, which is referred to as "melting temperature" or "Tm", serves as rate for the stability of a protein. Thermal unfolding experiments are particularly popular in the fields of protein engineering and formulation development and with respect to screening methods since thus a high amount of samples can be assessed easily and parallel.

Similar unfolding curves can be achieved by chemical denaturation experiments, which may, in addition to thermal unfolding experiments, provide information regarding thermodynamic parameters and equilibriums with respect to folding and unfolding of proteins.

The fluorescence of the tryptophans in a protein largely depends on their direct environment. Usually, changes of the protein structure influence both the intensity and the emission wavelength of the tryptophan fluorescence. The device according to the invention is preferably provided with fluorescence detectors which measure the fluorescence intensity at two different wavelengths, namely 330 nm and 350 nm, which makes the device sensitive regarding both the change of the fluorescence intensity and the shifting of the fluorescence maximum when unfolding.

Protein denaturation curves are used in order to derive important stability parameters. Usually, the thermal stability of a determined protein is described by the melting temperature Tm, at which half of the protein population is unfolded. Tm can be calculated by means of changes of the tryptophan fluorescence intensity or by means of the relation of the tryptophan emission at 330 and 350 nm which describes the shifting of the tryptophan emission when unfolding. Usually, the quotient 350/330 nm results in data having well-defined transitions with regard to the unfolding of proteins, whereas Tm cannot always be derived by means of the single wavelength detection. Thus, the dual wavelength system of the device provides for a sensitive detection of unfolding processes.

The device according to the invention (for example PROMETHEUS™ NT.48) may be used in laboratories for formulation and quality control. Due to the wide range of concentrations, biopharmaceuticals with very high concentrations, which are usually used with respect to formulation, may be examined. The nano DSF technology for applications in the field of antibody engineering used by the PROMETHEUS™ device is particularly suitable, since the ultra-high resolution makes it possible to detect and analyze multiple transitions and unfolding events. Further, with nano DSF it is possible to measure the stability of membrane proteins in detergents since this method is really marker-free and does not need a fluorescent dye.

Further, in the following a preferred embodiment is discussed.

One condition for both the basic understanding of protein unfolding mechanisms and for the successful development of biologicals in the pharmaceutical industry is a detailed analysis of the protein stability. Subsequently, the performance of the new instrument PROMETHEUS™ NT.48 is shown, which detects intrinsic protein fluorescence changes during thermal or chemical unfolding of up to 48 samples in a parallel manner Introduction The estimation of protein stability is an integral part of the basic research, active ingredient research and drug development [1]. For example, shiftings of the melting temperature (Tm) of a target protein when bonded to a low-molecular ligand in primary screens in the active ingredient research process are used as a matter of routine [2]. Additionally, the thermal and chemical stability of biological, for example antibodies, is often supervised in order to create optimum conditions for the large-scale production and long-term storage [3, 4]. Further, the careful analysis of unfolding and backfolding mechanisms of proteins may provide important knowledge about the thermodynamic origins of the folding of proteins, which helps to explain the molecular basis of degenerative diseases like Alzheimer's, Parkinson's or diabetes.

The properties of the fluorescent amino acid tryptophan form the basis of marker-free fluorometric analysis of the folding of proteins. Since tryptophan is a hydrophobic amino acid, it is mostly located in the hydrophobic core of proteins where it is shielded from the surrounding aqueous solvent. After unfolding, however, tryptophan lies open which changes its photophysical properties [6]. By detecting changes of the intensity of the fluorescence of tryptophan and the shifting of the emission peak the transition of a protein from folded to unfolded state may precisely be recapitulated. Melting temperature (Tm) and thermodynamic properties may be determined in this way [7].

Figure 12:
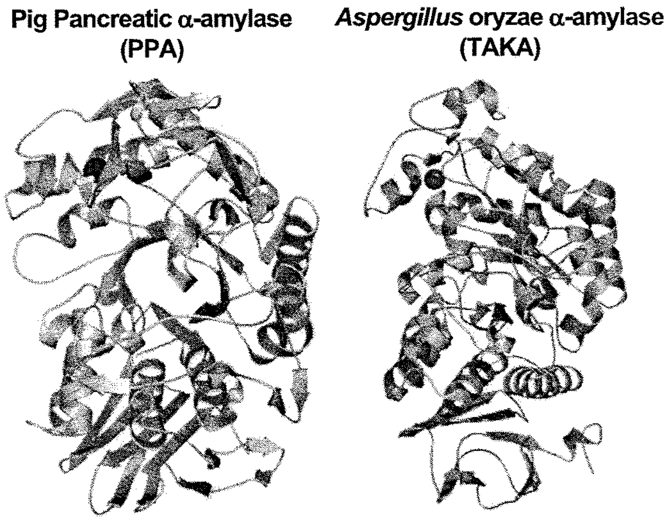

In the following, the performance of PROMETHEUS™ NT.48 with respect to monitoring the thermal unfolding of proteins in a formulation screening project is demonstrated. The instrument PROMETHEUS™ NT.48 can measure up to 48 samples at the same time and uses high precision capillaries which are filled with only 10 μl of sample. By means of a detector which is configured particularly to monitor changes of the emission spectrum of tryptophan with maximum sensitivity and speed, the highest amount of data point concentration is reached. Proteins of the α-amylase family are time-tested with respect to analysing the folding of proteins [8]. Most amylases have very similar tertiary structures with three (β/α) barrel domains and at least one conserved $Ca^{2+}$ binding site (FIG. 12). FIG. 12 shows the structure of α amylase of pig pancreas (PPA, green) and α amylase of *Aspergillus oryzae* (TAKA, blue). The red bullet is a $Ca^{2+}$ ion.

At the same time, however, they have an extremely wide range of melting temperatures (from 40° C. to 110° C.), which makes them perfect for the basic research of determinants of the thermal stability of proteins [9]. Apart from their value for the medical basic research, amylases are used commercially when producing ethanol in sugars in the large-scale production.

In the present example, the thermal unfolding of α amylase of mammals (α amylase of pig pancreas, PPA) and fungi (α amylase of *Aspergillus oryzae*, TAKA) was examined. The stabilization effects of calcium ions on the protein conformation were recapitulated and finally formulation screens with different additives which improve the thermal stability to different degrees were conducted.

The instrument PROMETHEUS™ NT.48 monitors the shifting of the intrinsic tryptophan fluorescence of proteins when unfolding by detecting the fluorescence at an emission wavelength of 330 and 350 nm. In order to determine the protein melting point (Tm, when half of the protein is folded and the other half is unfolded), the change of the fluorescence in one of the two channels may be used or alternatively the relation of the fluorescence intensities (quotient of F330/F350) may be applied.

For most proteins, the latter way is preferred since the fluorescence quotient monitors both, the change of the fluorescence intensity of tryptophan and a shifting of the emission maximum of the fluorescence to higher wavelengths ("red shift") or lower wavelengths ("blue shift"). The thermal unfolding of PPA and TAKA was conducted with a heating speed of 1° C./minute, which produced a data point concentration of 10 points/° C., by which it may be exactly determined when the protein begins to unfold and the transition from folded to unfolded may exactly be adapted by mathematical models.

Figure 13A:
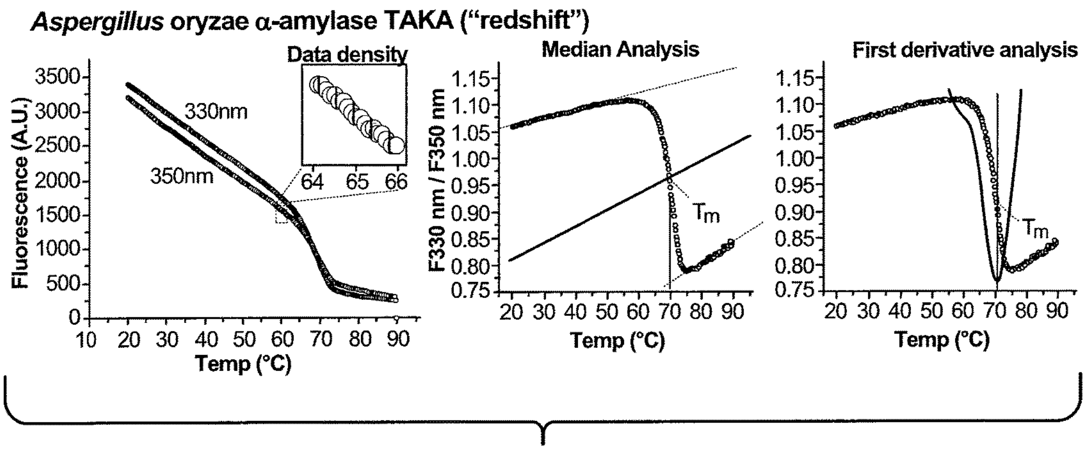
Figure 13B:
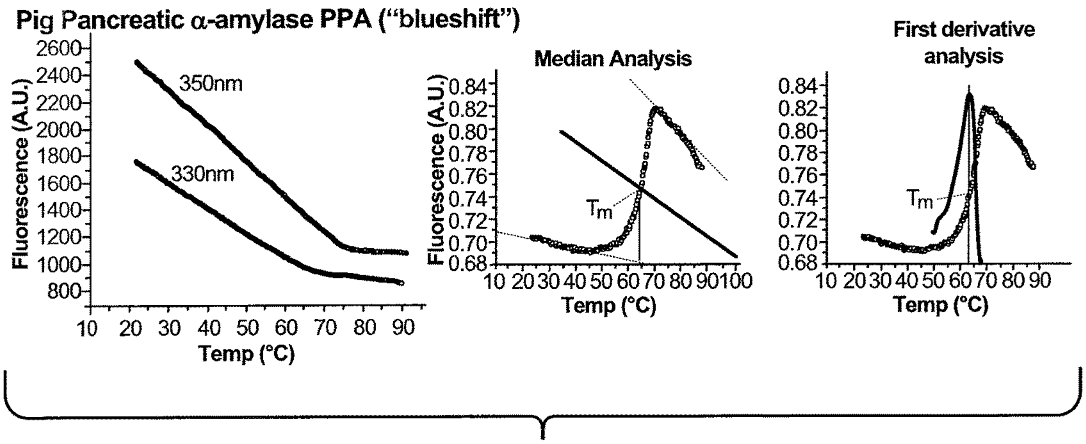

FIG. 13 shows changes in the tryptophan fluorescence of PPA and TAKA when thermally unfolding. Particularly with respect to TAKA, the fluorescence raw data of both wavelengths show a clear transition from folded to unfolded (FIG. 13A, left), which may directly be used for Tm analysis. In contrast thereto, said transition is not evident on the basis of the raw data for PPA (FIG. 13B, left). Furthermore, whereas TAKA showed a typical unfolding profile with a shifting of the tryptophan fluorescence to higher wavelengths (red shift), PPA shows a less broadened shifting of the tryptophan fluorescence to lower wavelengths (blue shift).

When the fluorescence quotient F330/F350 of both proteins was applied as function of the temperature, clear melting curves resulted, which could be used to analyze the corresponding melting temperature of the amylase isoforms. Different methods may be used to determine the melting temperature: for the median analysis first a lower and an upper base line are defined and a median line is inserted. The intersection point between experimental curve and the median line is defined as Tm (FIGS. 13A and B, center). Alternatively, the maximum of the first derivative of the absorbance signal may be determined. With said method, the somewhat subjective determination of the base line values (FIGS. 13A and B, right) may be avoided and furthermore several melting points may be determined, for example with respect to unfolding of antibodies or more complex multi domain proteins.

The standard discrepancy of the results in the table in FIG. 14B from the analysis of the first derivative most importantly lies in the range of the approximation error, which demonstrates the maximum reproducibility of the results. Thus, the instrument PROMETHEUS™ NT.48 can be used to exactly determine Tm values with a minimum of samples and time.

The results show that both reproducibility and exactness of the thermal unfolding experiments with PPA and TAKA were very high (FIGS. 14A and B). The Tm values received were pretty similar to the values cited in literature [9].

$Ca^{2+}$ dependence of the thermal stability of amylase

A second series of experiments aimed to recapitulate the stabilization effects of $Ca^{2+}$ ions on both α amylase isoforms. It has already been proven that $Ca^{2+}$ ions are required for increased Tm values of different amylase isoforms in the range from almost no effect for amylase from *Alteromonas* to an increase of Tm by 50° C. for amylase from *Bacillus licheniformis* [9].

In order to examine the effects of $Ca^{2+}$ ions on the stability of PPA and TAKA, both proteins were incubated in buffers with 5 mM EDTA in order to remove bonded $Ca^{2+}$ 30 minutes before thermal unfolding experiments. As expected, the removal of $Ca^{2+}$ ions by EDTA led to a significant increase of Tm for both forms of amylase (FIG. 15). ΔTm was more distinctive with respect to PPA (−16.6° C.) than for TAKA (−12° C.), which well correlates with previously published results (PPA −17° C., TAKA −14° C.) [10, 11].

Effects of Buffer Additives on the Thermal Stability of Amylase

A screening on additives and buffer conditions which improve the protein stability, which is also named formulation screening, is very important for maximum storage stability of antibodies and other biologica. With the help of PROMETHEUS™ NT.48 the effects of different buffer additives for which it has already been shown that they improve protein stability, i.e. glycerol, sucrose, trehalose and sorbitol with concentrations in the range of 10% to 40% (weight per volume) of PPA and TAKA, were tested.

The formulation screen of 16 different buffer conditions for each amylase isoform was conducted in a single run with a temperature range of 20° C. to 90° C. and a heating speed of 1° C./minute. The measurements were conducted within approximately 70 minutes with a total of 400 μl of samples (10 μl for each buffer condition plus 4 control experiments for each isoform without additive) and a total of proteins of just 80 μg.

Figure 16A:
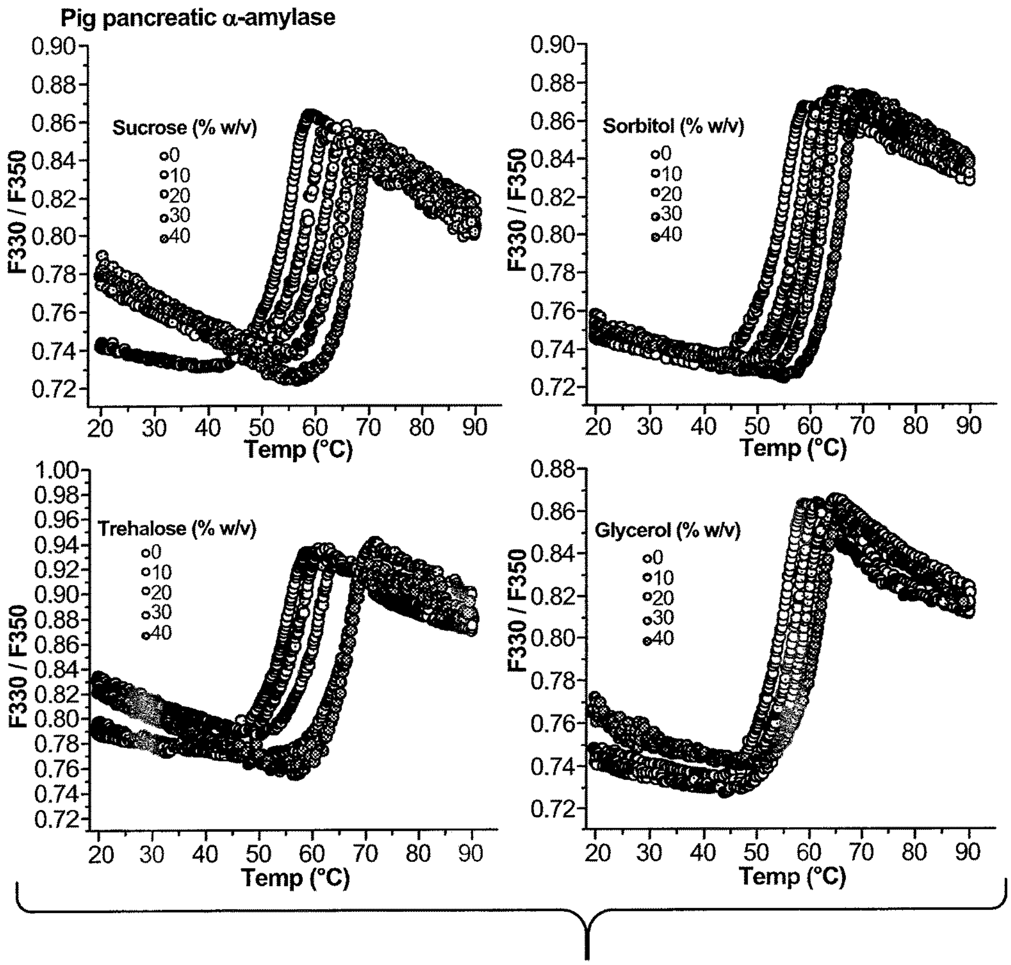
Figure 16B:
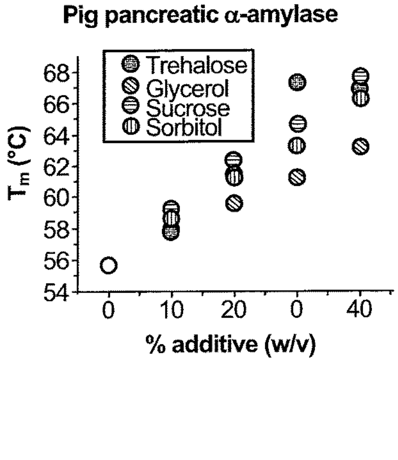
Figure 17A:
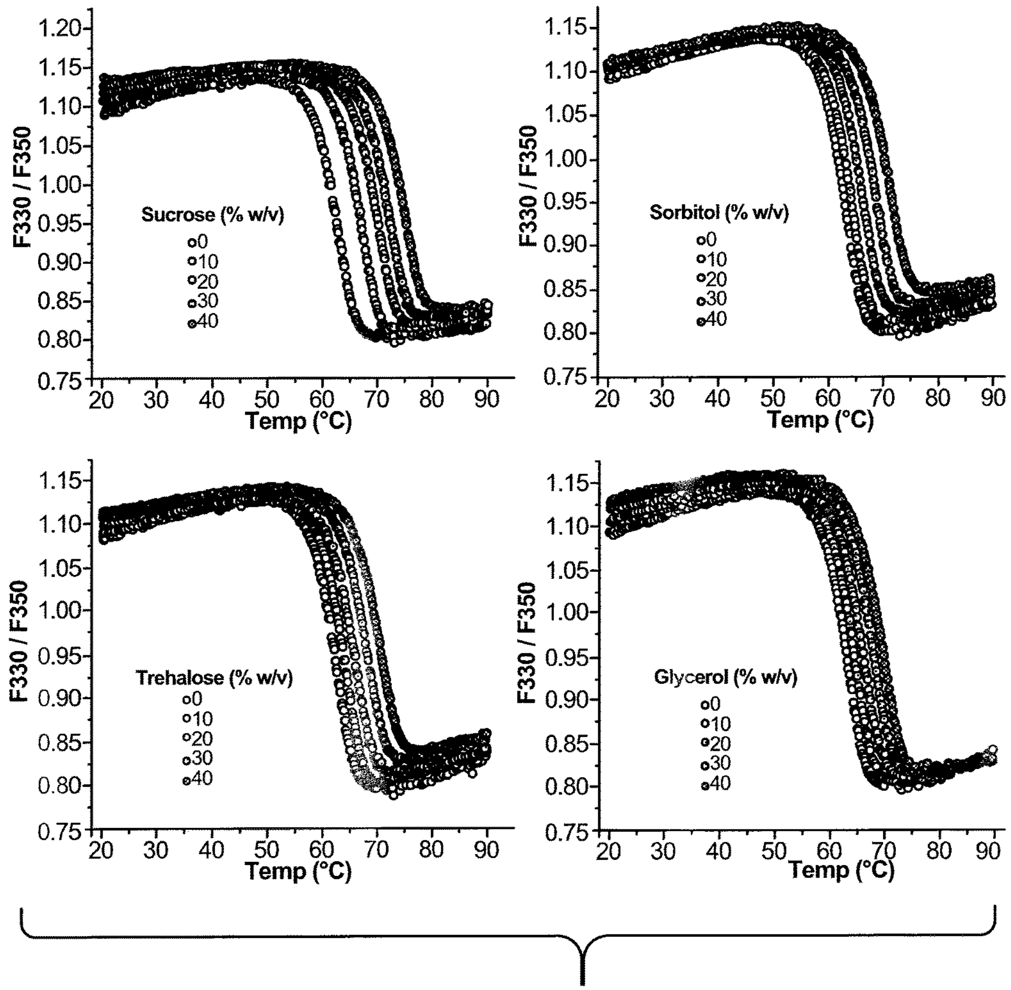

The plots of the quotients of the tryptophan fluorescence clearly show that each additive increased the Tm of PPA and TAKA dependent on the concentration. Regarding PPA, trehalose was already most effective with concentrations of 30% (+12° C.) whereas glycerol was most ineffective and increased Tm at a concentration of 40% merely about 7.5° C. (FIGS. 16 A and B). Regarding TAKA the addition of 40% of sucrose was most effective with respect to the increase of Tm (+12° C.) whereas glycerol and trehalose showed the least effect (+7.5° C. and +8° C., respectively) (FIGS. 17A and B). These results conform to a previous study which examined the effect of additives on the thermal unfolding of *Bacillus*-α-amylase [12].

Conclusions

In the present case study, the performance of the instrument PROMETHEUS™ NT.48 with respect to thermal unfolding properties of two α-amylase isoforms in screening applications was demonstrated.

By detecting changes of the tryptophan fluorescence at two defined wavelengths, Tm values of the amylase proteins under different conditions could be determined. All results are very similar to published values. However, in comparison to methods which use standard fluorimeters, it is most important that both the waste of samples and the time involved for conducting the experiments are drastically reduced when using the PROMETHEUS™ NT.48.

The capillary format of the instrument enables a flexible configuration of experiments wherein each number of samples between 1 and 48 is measured at the same time. It is important that the use of PROMETHEUS™ capillaries offers an even higher precision of UV fluorescence detection than high-performance quartz cuvettes, in addition to the advantages of low waste of samples, high output and high versatility. Furthermore, cross-contamination is avoided due to the method based on capillaries and cumbersome and time-consuming cleaning steps are not required. Further, high scanning speeds and thus a high data concentration enable a robust analysis of melting curves by mathematical adaptation algorithm and further a precise determination of beginning unfolding.

Additionally, the direct detection of tryptophan fluorescence for monitoring the unfolding of proteins has more useful effects compared to other methods which are routinely used in order to monitor thermal unfolding, for example differential scanning fluorimetry (DSF) or thermofluor assays. Said assays use external fluorophores which bond to hydrophobic parts of the protein which are usually buried in the core of the protein. During unfolding, said parts are uncovered and the fluorophore bonds, which leads to increasing fluorescence. However, said assays are not suitable for a detailed analysis of the thermodynamics of folding since they disturb the folding-unfolding balance by direct interaction with the proteins. Furthermore, the external fluorophores are not compatible with a number of buffers (i.a. for example detergents) or protein types, for example membrane proteins. Finally, although DSF is routinely used in primary screenings in the active agent researching process, external fluorophores may interact with compounds or block bonding sites and produce wrongly negative or wrongly positive results.

In addition to its properties with respect to the parallel monitoring of thermal unfolding of a high number of proteins, the purpose of the instrument PROMETHEUS™ NT.48 may also be to analyze the chemical denaturation of proteins within seconds. In summary, the results show that the instrument PROMETHEUS™ NT.48 is exceptionally well suited for a fast, precise and cost-efficient characterization of the stability of proteins both in academic and the industrial fields. Due to its flexibility and speed it becomes a precious tool for a large amount of different experimental methods, from the efficient characterization of the folding of proteins to screening projects having a high output.

Materials and Methods

Sample Preparation

α-amylase from the pig (α-amylase from pig pancreas, PPA, Roche) and α-amylase from *Aspergillus oryzae* (TAKA, Sigma) were solved in 30 mM Hepes, 50 mM NaCl, 2 mM $CaCl_2$, pH 7.4 with concentrations of 10 mg/ml. Final concentrations in thermal unfolding experiments were 10 μM. For the removal of residual traces of ammonium sulfate or other contaminants, a buffer exchange by means of buffer exchange centrifugal columns (NanoTemper Technologies) was conducted. In order to determine the dependence of the α-amylase on $Ca^{2+}$, a second buffer exchange was conducted to buffer without $CaCl_2$ but with 5 mM EDTA.

For the formulation screen, proteins were inserted in 20 mM of Na-citrate-buffer, pH 5.9 with the respective concentrations of sucrose, sorbitol, trehalose or glycerol.

Thermal Unfolding Experiments

For thermal unfolding experiments, proteins were diluted on a final concentration of 10 μM. 10 μl of sample were prepared per capillary for each condition. The samples were inserted in UV capillaries (NanoTemper Technologies) and experiments were conducted by means of PROMETHEUS™ NT.48. The temperature gradient was adjusted to an increase of 1° C./min in a range from 20° C. to 90° C. The unfolding of proteins was measured by detecting the changes of the tryptophan fluorescence dependent on temperature at emission wavelengths of 330 and 350 nm.

Data Analysis

Melting temperatures are determined by detecting the maximum of the first derivative of the fluorescence quotient (F330/F350). This was reached by calculating a polynomial adaptation of $8^{th}$ order for the transition region. Next, the first derivative of the adaptation was formed and the peak position (at Tm) was determined.

FIG. 13: analysis of TAKA and PPA melting curves. (A) plot of the decaying of the tryptophan fluorescence with respect to thermal unfolding of TAKA (left). The transition from the folded to the unfolded state is already visible in the fluorescence raw data at emission wavelengths of 330 and 350 nm. The adjacent image demonstrates the high data point concentration of PROMETHEUS™ NT.48. In order to determine Tm, two methods may be used. When using the median analysis (center), a median line between an upper and lower base line is defined. The intersection of the median line with the experimental data represents Tm. Alternatively, the experimental data may be adapted with a polynomial function. Its first derivative shows a peak at the point of maximum steepness, which corresponds to Tm (right). (B) Equivalent analysis of Tm for PPA. It has to be considered that the transition from folded to unfolded protein is not visible in the fluorescence raw data (left), contrary to TAKA, whereas Tm may easily be determined by means of the plotting of the fluorescence quotients (right).

FIG. 14: exactness and reproducibility of the unfolding data of PROMETHEUS™ NT.48. (A) The plots represent an overlap of ten melting curves of PPA and TAKA which are independently registered. (B) The determination of Tm of both proteins shows a small standard discrepancy between the experiments (≤0.2° C.) and a good correlation with published results [9].

FIG. 15: $Ca^{2+}$ effects on stability of amylase. By removing $Ca^{2+}$ ions both amylase isoforms are significantly destabilized, to which the shifting of Tm to lower values refers.

FIG. 16: Formulation screening of PPA. In order to determine optimum conditions for an increased thermal stability of PPA, its thermal unfolding at 16 different additive conditions was monitored. A significant shifting of Tm to higher values can be observed in the plotting of the fluorescence quotients for each additive. By quantifying Tm at different conditions, it can be observed that the addition of 30% of trehalose is most efficient whereas glycerol has the least effect.

Figure 17B:
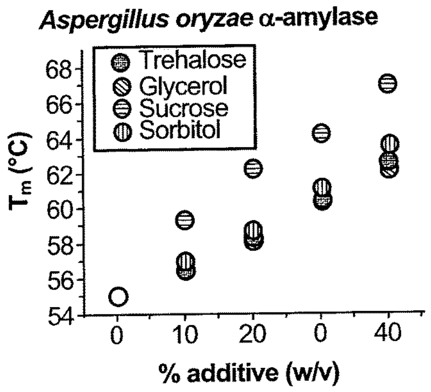

FIG. 17: Formulation screening of TAKA. In order to determine optimum conditions for an increased thermal stability of TAKA, its thermal unfolding at 16 different additive conditions was monitored. A significant shifting of Tm to higher values can be observed in the plotting of the fluorescence quotients for each additive. By quantifying Tm at different conditions, it can be observed that the addition of 40% of sucrose is most efficient whereas glycerol and trehalose have the least effect.

Literature

One preferred embodiment for an apparatus according to the invention or system according to the invention, in the following again referred to as PROMETHEUS™ NT.48 with nano DSF technology, is described.

With the PROMETHEUS™ series, NanoTemper Technologies offers the nano DSF technology, i.e. the method of choice for the easy, fast and exact analysis of the folding and stability of proteins with applications in the field of protein engineering, in the formulation development and quality control.

Preferred useful effects of nano DSF are:

- benefiting from native DSF—no dye, independence of buffers and detergents
- monitoring more transitions—due to high resolution
- obtaining results faster—working with smaller amounts of samples
- measuring in a wide range of concentration from 5 μg/ml to 150 mg/ml Nano DSF is an advanced technology of the Differential Scanning Fluorimetry on the basis of the detection of the smallest changes in the intrinsic fluorescence of the amino acid tryptophan.

The fluorescence of the tryptophans in a protein strongly depends on their vicinity. By tracking the changes in the fluorescence of the amino acid tryptophan, chemical and thermal stability can be assessed veraciously in a marker-free manner.

Since furthermore no secondary reporting fluorophores are required, protein solutions may be analyzed independently from buffer combinations and over a maximum protein concentration range, from 150 mg/ml to only 5 μg/ml, due to which membrane proteins solubilized by detergents and also highly concentrated antibody formulations may be analyzed.

The dual UV technology by NanoTemper enables on-the-fly fluorescence detection, which causes a preeminent scanning speed and data point concentration and thus an ultra-high resolution of unfolding curves, which makes it possible to detect even the smallest unfolding signals.

In the following table preferred technical features are summarized:

| | PROMETHEUS ™ NT.48 |
|---|---|
| Samples per run | 48 samples |
| Fluorescence detection | 330/350 nm |
| Marker required | No marker, no dye |
| Concentration of the fluorescent molecule | 5 μg/ml to >150 mg/ml |
| Molecular mass range (Da) | 101-107 |
| Volume per measurement | 10 μl |
| Temperature control | 4° C. to 98° C. |
| Heating speed | 0.1-10° C./min |
| Biophysical parameters | Centers of denaturation Tm and Cm |
| Tryptophan fluorescence required | Yes |
| Measurement in detergents | Yes |
| Time for experiment and analysis | Minutes-hours |
| Immobilization required | No |
| Maintenance required | No |

Protein denaturation curves are used to derive important stability parameters. Usually, the thermal stability of a specified protein is described by the melting temperature Tm at which half of the protein population is unfolded.

Tm can be calculated by means of the changes in the fluorescence intensity of tryptophan or by means of the ratio of the tryptophan emission at 330 and 350 nm, which describes the shifting of the tryptophan emission when unfolding.

Typically, the quotient of 350/330 nm provides data with well-defined transitions when the protein unfolds, whereas Tm cannot always be derived by means of the single wavelength detection. Thus, the dual wavelength system of PROMETHEUS™ NT.48 provides a sensitive detection of unfolding processes.

The invention also comprises the accurate or exact expressions, features, numeric values or ranges etc when said expressions, features, numeric values or ranges are before or subsequently named with terms like "approximately, about, substantially, generally, at least" etc (i.e. "approximately 3" should also comprise "3" or "substantially radial" should also comprise "radial").

The invention claimed is:

1. A method for tempering at least one capillary, each of which is at least partially filled with a liquid column and positioned on a carrier, wherein the carrier having a length, width and height receives the at least one capillary along the width of the carrier, and the liquid column of each of the at least one capillary comprises two ends and is aligned to a silicon tempering element while positioned on the carrier in such a manner that at least one end of the liquid column projects beyond the tempering element and the capillary is in contact with the tempering element so that at least one part of the capillary and the liquid column contained therein is tempered, wherein the ends of the capillary are unsealed during tempering.

2. The method according to claim 1, wherein the at least one capillary comprises a length between 40-75 mm.

3. The method according to claim 1, wherein the width of the tempering element is between 5-34 mm.

4. The method according to claim 3, wherein the tempering element is formed integrally along the width of the tempering element or comprises several tempering regions separated from each other, which may adjacently contact each other or cover the width of the tempering element with at least one spacing.

5. The method according to claim 1, wherein the at least one capillary is pressed onto the tempering element by a lid, in order to guarantee a contact between capillary and tempering element.

6. The method according to claim 1, wherein the capillary is filled with an aqueous sample solution or a solvent, in particular with buffer solvents for biochemical/biological measurements.

7. The method according to claim 1, wherein the length of the liquid column in the capillary is at least 1.1-fold the width of the tempering element.

8. The method according to claim 1, wherein the capillaries i) have an inner diameter of 0.02 to 0.9 mm; and/or ii) an outer diameter of 0.1 to 2 mm.

9. The method according to claim 1, wherein the capillaries are made of glass.

10. The method according to claim 1, wherein the cross-section of a capillary may be round, oval, triangular, quadrangular, pentagonal, hexagonal, octagonal, semi-circle or trapezoidal, or comprise any other irregular shape.

11. A method for optically examining samples filled in capillaries comprising the steps of:

filling capillaries with samples;

arranging the capillaries on a carrier;

tempering the capillaries according to a method of claim 1;

exciting the samples with light, preferably with UV light; and measuring the light which is emitted by the samples in the capillaries.

12. A tempering device for tempering a plurality of capillaries, in particular according to claim 1, wherein the device comprises:

a carrier for receiving a plurality of capillaries, and a tempering device with a silicon tempering element for tempering the capillaries.

13. The tempering device according to claim 12, wherein the carrier can receive 48 capillaries.

14. A system for optically examining samples in capillaries comprising:

a tempering device for tempering the capillaries according to claim 12;

at least one capillary, preferably a non-deformable capillary; and/or an optical measurement system for emitting light, preferably UV light, and detecting light, preferably in the UV range, which is emitted by the samples in the capillaries.

15. The method according to claim 2 (or 1), wherein the at least one capillary comprises a length between 45-55 mm.

16. The method according to claim 15 (or 2 or 1), wherein the at least one capillary comprises a length of approximately 50 mm.

17. The method according to claim 3 (or 1), wherein the width of the tempering element is between 20-30 mm.

18. The method according to claim 17 (or 1 or 3), wherein the width of the tempering element is between 20-25 mm.

19. The method according to claim 18 (or 1 or 3 or 17), wherein the width of the tempering element is between 20-25 mm.

20. The method according to claim 7 (or 1), wherein the length of the liquid column in the capillary is at least 1.2-fold the width of the tempering element.

21. The method according to claim 8 (or 20 or 7 or 1), wherein the length of the liquid column in the capillary is at least 1.3-fold the width of the tempering element.

22. The method according to claim 9 (or 1), wherein the capillaries are made of borosilicate 3.3 quartz.

23. The method according to claim 22 (or 9 or 1), wherein the capillaries are made of synthetic fused silica.

* * * * *